US012063510B2

(12) United States Patent
Preda et al.

(10) Patent No.: US 12,063,510 B2
(45) Date of Patent: Aug. 13, 2024

(54) SIGNALLING STORM MITIGATION IN A SECURED RADIO ACCESS NETWORK

(71) Applicant: Telefonaktiebolaget LM Ericsson (publ), Stockholm (SE)

(72) Inventors: Stere Preda, Longueuil (CA); Amine Boukhtouta, Montreal (CA); Daniel Migault, Montreal (CA); Fereydoun Farrahi Moghaddam, Brossard (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 683 days.

(21) Appl. No.: 17/273,243

(22) PCT Filed: Sep. 4, 2018

(86) PCT No.: PCT/IB2018/056753
§ 371 (c)(1),
(2) Date: Mar. 3, 2021

(87) PCT Pub. No.: WO2020/049335
PCT Pub. Date: Mar. 12, 2020

(65) Prior Publication Data
US 2021/0329456 A1    Oct. 21, 2021

(51) Int. Cl.
*H04W 12/088* (2021.01)
*H04L 9/40* (2022.01)
(Continued)

(52) U.S. Cl.
CPC ....... *H04W 12/088* (2021.01); *H04L 63/0428* (2013.01); *H04W 12/041* (2021.01);
(Continued)

(58) Field of Classification Search
None
See application file for complete search history.

(56) References Cited

U.S. PATENT DOCUMENTS

| 7,181,612 B1 | 2/2007 | Pellacuru et al. |
| 7,234,063 B1 | 6/2007 | Baugher et al. |

(Continued)

FOREIGN PATENT DOCUMENTS

| JP | 2005175825 A | * | 6/2005 |
| WO | 2009073504 A2 | | 6/2009 |

(Continued)

OTHER PUBLICATIONS

Author Unknown, Wikipedia—Node (networking), pp. 1-3, Jul. 3, 2018.*

(Continued)

*Primary Examiner* — Christopher M Crutchfield
(74) *Attorney, Agent, or Firm* — Weisberg I.P. Law, P.A.

(57) ABSTRACT

Apparatuses and methods are disclosed for enabling signalling storm mitigation in Internet Protocol (IP) Security (IPsec)-secured virtual Radio Access Network (vRAN). In one embodiment a method in a first network node includes receiving a trigger to establish an IPsec session with a second network node, the IPsec session being associated with a user equipment (UE); responsive to the trigger to establish the IPsec session associated with the UE, derive a unique identifier for the UE; generate a Security Parameter Index (SPI) value based at least in part on the unique identifier derived for the UE, the SPI value being unique to the IPsec session; and communicate an indication of the SPI value to the second network node.

34 Claims, 9 Drawing Sheets

(51) Int. Cl.
   *H04W 12/041*     (2021.01)
   *H04W 12/06*      (2021.01)
   *H04W 12/69*      (2021.01)
   *H04W 76/12*      (2018.01)

(52) U.S. Cl.
   CPC ........... *H04W 12/06* (2013.01); *H04W 12/69* (2021.01); *H04W 76/12* (2018.02)

(56) References Cited

U.S. PATENT DOCUMENTS

| | | | |
|---|---|---|---|
| 7,434,045 | B1 | 10/2008 | Enderwick et al. |
| 8,346,949 | B2 | 1/2013 | Vaarala et al. |
| 10,326,615 | B2* | 6/2019 | Baboescu ......... H04W 28/0865 |
| 2002/0062344 | A1* | 5/2002 | Ylonen ................. H04L 63/164 |
| | | | 709/204 |
| 2002/0097724 | A1* | 7/2002 | Halme ................ H04L 67/1023 |
| | | | 370/392 |
| 2011/0047612 | A1* | 2/2011 | D'ambrosio .......... H04W 12/08 |
| | | | 726/12 |
| 2012/0026869 | A1* | 2/2012 | Wang ................. H04L 43/0858 |
| | | | 370/252 |

FOREIGN PATENT DOCUMENTS

| | | |
|---|---|---|
| WO | 2009132666 A1 | 11/2009 |
| WO | 2018/075930 A1 | 4/2018 |

OTHER PUBLICATIONS

Communication Pursuant to Article 94(3) EPC dated Feb. 3, 2023 issued in corresponding European Patent Application No. 18 783 097.1, consisting of 6 pages.

International Search Report and Written Opinion dated May 20, 2019 for International Application No. PCT/IB2018/056753 filed on Sep. 4, 2018, consisting of 12-pages.

3GPP TS 33.402 V10.1.0 (Sep. 2011); 3rd Generation Partnership Project; Technical Specification Group Services and System Aspects; 3GPP System Architecture Evolution (SAE); Security Aspects of Non-3GPP Accesses (Release 10), consisting of 47 pages.

S. Kent; IP Authentication Header; Network Working Group; Request for Comments: 4302; Obsoletes: 2402; Category: Standards Track; BBN Technologies, Dec. 2005, consisting of 34 pages.

S. Kent et al.; Security Architecture for the Internet Protocol; Network Working Group; Request for Comments: 4301; Obsoletes: 2401; Category: Standards Track; BBN Technologies, Dec. 2005, consisting of 101 pages.

* cited by examiner

SIGNALLING STORM MITIGATION IN A SECURED RADIO ACCESS NETWORK

CROSS-REFERENCE TO RELATED APPLICATION

This application is a Submission Under 35 U.S.C. § 371 for U.S. National Stage Patent Application of International Application Number: PCT/IB2018/056753, filed Sep. 4, 2018 entitled "SIGNALLING STORM MITIGATION IN A SECURED RADIO ACCESS NETWORK," the entirety of which is incorporated herein by reference.

TECHNICAL FIELD

Wireless communication and in particular, signalling storm mitigation in secured radio access networks (RAN).

BACKGROUND

Virtual RAN (vRAN), which may otherwise be known as Next Generation-RAN (NG-RAN) or cloud RAN, is being developed for 5G. Virtual RAN represents a virtual infrastructure that seeks to optimize RAN to one or more of: (1) deliver legacy RAN benefits and, additionally, alleviate the core network signalling (e.g., keep the mobility signalling in the RAN); and (2) deliver cloud benefits (e.g., resource pooling, improved reliability with geo-redundancy, etc.), together with reducing capital expenditure (CAPEX) and operational expenditure (OPEX), enabling multi-tenants, resiliency, deterministic computing performance, as well as, potentially providing a ground for new business models.

The vRAN system architecture considers a flexible scheme to place at least some of the entities of the random access network (RAN), which have been traditionally placed at the antenna site, in the cloud and to enable collaboration between such entities.

FIGS. 1A and 1B illustrate an example vRAN system architecture and, in particular, at least some of the protocol stack layers and interfaces of the exemplary vRAN system architecture. Generally, FIG. 1A illustrates an example vRAN connected to a core network (CN) 10 over an S1 interface. The vRAN includes a radio 12 for the vRAN to communicate with a user equipment (UE) 14 over a Uu interface. The vRAN includes three layers, namely, Layer 1, Layer 2, and Layer 3, which are known in the art and therefore will not be discussed in detail herein. The protocol stack functions may include Packet Data Convergence Protocol (PDCP), Radio Resource Control (RRC), Radio Link Control (RLC), and Medium Access Control (MAC), which are also known in the art and therefore will not be discussed in detail herein. FIG. 1B illustrates an example vRAN architecture showing an example implementation and interfaces between the layers. Specifically, the vRAN architecture shown in FIG. 1B illustrates the PDCP being handled by a packet processing function (PPF), the RRC being handled by a radio control function (RCF), and a baseband processing function (BPF) handling the RLC and MAC. The PPF-to-RCF interface is an E6 interface. The PPF to BPF interface is an F1-U interface and the RCF to BPF interface is an F1-C interface. The interfaces and functions depicted in FIGS. 1A and 1B are meant to be exemplary and are not intended to be limiting. With vRAN, the access network entities requiring tight synchronization in the protocol stack and stringent latency may be placed closer to the radio environment (i.e., closer to the end-user UE 14)), such as e.g., at the antenna site or hub-site. Such entities may be referred to herein as the BPF. The BPF may be, for example, a gNB-DU. On the other hand, the entities with radio asynchronous functions may be virtualized (e.g., in the Central Office (CO)). Such virtualized access network entities may include the PPF and/or the radio control function RCF. The RCF may be, for example, gNB-Centralized Unit (CU) and/or gNB-CU-Control Plane (CP). PPF may be, for example, gNB-CU-User Plane (UP). It should be understood that these entities, e.g., BPF, PPF, and RCF, may be referred to by other names in the art. Depending on the implementation, the vRAN may further include other entity, such as another entity sometimes referred to as vUE that manages some UE identifiers, such as, for example, Cell Radio Network Temporary Identifiers (C-RNTI) and/or other UE identifiers (ID). Any networking solution used to separate and interconnect the BPFs with the vRAN entity(ies) should satisfy the latency requirements on any newly introduced interfaces in RAN.

FIG. 2 illustrates pools of vRAN resources in a cloud 16. The vRAN resources may include a pool of BPFs that may connect to a pool of PPFs and a pool of RCFs. Resources for vRAN may be pooled and RAN functions or instances of RAN functions may be dynamically and/or automatically created when and where they are needed. For example, FIG. 3 illustrates a scenario where there may be a full mesh between the BPFs and vRAN entities in the cloud 16. At least some of the functions of vRAN may be deployed in a virtual environment and managed to scale out e.g., the PPFs where the current instances are, for example, overloaded. In this manner, the radio heads and BPFs may connect, for example, to another site and/or another pool of PPFs. As shown in FIG. 3, the vRAN entities in the cloud 16 may be connected to the core network 10 over e.g., the S1 interface and the BPFs and virtualized PPFs in the cloud 16 may be connected over e.g., the F1-U interface.

There are efforts to protect the vRAN interfaces (e.g., F1-C, F1-U, etc.) against various threats, such as, for example, unauthorized access, Distributed Denial of Service (DDoS) attacks, other threats associated with cloud environments, etc. Protection solutions can range from software (SW) firewalls (i.e., controlling the inter-process calls, message conformance, etc.) to controlling access to the various entities (e.g., BPF, PPF, RCF, etc.) and protecting such entities at the level of the underlying transport (which is Internet Protocol (IP)-based).

IP Security (IPsec) or Transport Layer Security (TLS) may be employed for confidentiality and integrity, especially if the vRAN and antenna/BPF sites are geographically distributed with internetworking under third-party responsibility and administration. Also, the end-user UE UP data is Packet Data Convergence Protocol (PDCP)-ciphered (up to the PPF) to provide over-the-air protection.

A recurrent problem that arises in RAN and Core networks (CNs) is signalling overload. In signalling overload, the various entities and corresponding interfaces may be legitimately, or maliciously overloaded with signalling traffic. This may happen frequently in Internet-of-Things (IoT) deployments where, for example, devices react altogether to the same stimuli, creating a signalling storm. Signalling storm scenarios can happen for both uplink (UL) and downlink (DL) traffic. Signalling storm is conventionally dealt with either (1) by absorbing it through scaling out the RAN (e.g., adding more vRCFs) and CN entities (e.g., adding more resources at the Mobile Management (MME)/Access and Mobility Management Function (AMF) level) and traffic redirections; or (2) by throttling. In throttling, the interface protocol data units (PDUs) are filtered at a certain rate with a rate limiting functionality implemented at the vRAN or CN entity level through a functionality, such as, for example, a software firewall (SW FW) or application level firewall.

The second option that includes controlling PDU rates (e.g., throttling, rate limiting, firewall, redirection) is typically performed when the interface is already overloaded. In other words, the entity itself is already experiencing an overhead when the rate limiting is applied.

SUMMARY

Some embodiments advantageously provide methods and apparatuses that enable policy-based IP-level filtering in IPsec protected vRAN that can, for example, be used as a mitigation of signalling storms.

According to a first aspect, a first network node includes processing circuitry configured to receive a trigger to establish an Internet Protocol Security, IPsec, session with a second network node, the IPsec session being associated with a user equipment, UE; responsive to the trigger to establish the IPsec session associated with the UE, derive a unique identifier for the UE; generate a Security Parameter Index, SPI, value based at least in part on the unique identifier derived for the UE, the SPI value being unique to the IPsec session; and communicate an indication of the SPI value to the second network node.

According to this aspect, in some embodiments, the establishing the IPsec session with the second network node comprises an IPsec Security Association, SA, negotiation with the second network node. In some embodiments of this aspect, the trigger is associated with the IPsec SA negotiation with the second network node. In some embodiments of this aspect, the trigger is a request message, from the second network node, to establish the IPsec SA negotiation with the second network node. In some embodiments of this aspect, the trigger is one of a request message, a request message from the second network node, a control plane message, an indication of an establishment of a radio session for the UE, and a radio bearer establishment message. In some embodiments of this aspect, the processing circuitry is further configured to receive, from the second network node, an IPsec packet, the IPsec packet associated with the UE and the IPsec packet including the indication of the SPI value; decrypt and authenticate the received IPsec packet using at least the indication of the SPI value; and communicate, to a third network node, the decrypted packet. In some embodiments of this aspect, the SPI value maps to IPsec traffic associated with the UE between the first network node and the second network node. In some embodiments of this aspect, the processing circuitry is further configured to derive the unique identifier for the UE based at least in part on data associated with the UE and, as a result of the derivation, the generation of the SPI value is based at least in part on the data associated with the UE. In some embodiments of this aspect, the data used to derive the unique identifier and generate the SPI value uniquely identifies IPsec traffic associated with the UE for IP-level filtering of traffic between the first network node and the second network node. In some embodiments of this aspect, wherein the data used to derive the unique identifier for the UE and generate the SPI value includes at least one of a Cell UE Identifier, a Baseband Processing Function, BPF, Identifier, and a Cell Identifier. In some embodiments of this aspect, the data used to derive the unique identifier for the UE and generate the SPI value includes an identification of a radio bearer, RB, for the UE. In some embodiments of this aspect, the data used to derive the unique identifier for the UE and generate the SPI value is signalling data associated with the UE. In some embodiments of this aspect, the data associated with the UE is data corresponding to one of an Uplink, UL, channel and a Downlink, DL, channel for the UE. In some embodiments of this aspect, the processing circuitry is further configured to derive the unique identifier for the UE by concatenating the data associated with the UE. In some embodiments of this aspect, the processing circuitry is further configured to generate the SPI value by inputting the unique identifier into an invertible function that returns a 32-bit value representing the SPI. In some embodiments of this aspect, the indication of the SPI value is one of a clear text SPI value and an obfuscated SPI value. In some embodiments of this aspect, the processing circuitry is further configured to obfuscate the SPI value and the communication of the indication of the SPI value is a communication of the obfuscated SPI value to the second network node. In some embodiments of this aspect, the processing circuitry is configured to obfuscate the SPI value by being further configured to input at least the generated SPI value into a hash function. In some embodiments of this aspect, the processing circuitry is configured to obfuscate the SPI value by being further configured to input the generated SPI value and a key value into a hash function to generate the obfuscated SPI value. In some embodiments of this aspect, the processing circuitry is configured to receive, from the second network node, an IPsec packet, the IPsec packet including the indication of the SPI value; and decrypt and authenticate the received IPsec packet using at least the indication of the SPI value by being further configured to identify a Security Association, SA, of the IPsec packet via the obfuscated SPI value; decrypt the IPsec packet according to the identified SA to obtain payload data of the decrypted packet; determine the unique identifier for the UE and the SPI value from the decrypted payload data; input a key value and the determined SPI value into a hash function; determine whether the hash function returns an output value that is equal to the obfuscated SPI value; and one of communicate the decrypted packet and drop the decrypted packet based at least in part on whether the output value of the hash function is equal to the obfuscated SPI value. In some embodiments of this aspect, the processing circuitry is further configured to communicate, to a security node, at least the indication of the SPI value for Internet Protocol, IP, -level filtering of IPsec traffic between the first network node and the second network node. In some embodiments of this aspect, the processing circuitry is further configured to communicate, to the security node, a security action associated with the SPI value, the security action to be performed by the security node on IPsec traffic between the first network node and the second network node and the SPI value identifying the UE for the performance of the security action. In some embodiments of this aspect, the security action includes at least one of rate-limiting IPsec traffic associated with UE, accepting IPsec traffic associated with the UE, and rejecting IPsec traffic associated with the UE. In some embodiments of this aspect, the security node is a Layer 3 firewall for Internet Protocol, IP, traffic between the first network node and the second network node. In some embodiments of this aspect, one of the second network node and the first network node comprises at least one virtualized radio function in a cloud data center and the other one of the second network node and the first network node comprises a baseband function. In some embodiments of this aspect, the at least one virtualized radio function is a base station centralized unit, CU, in the cloud data center and the baseband function is a base station distributed unit, DU.

According to another aspect, a method is provided for a first network node. The method includes receiving a trigger to establish an Internet Protocol Security, IPsec, session with a second network node, the IPsec session being associated with a user equipment, UE; responsive to the trigger to establish the IPsec session associated with the UE, deriving a unique identifier for the UE; generating a Security Parameter Index, SPI, value based at least in part on the unique identifier for the UE, the SPI value being unique to the IPsec session; and communicating an indication of the SPI value to the second network node.

In some embodiments of this aspect, establishing the IPsec session with the second network node comprises an IPsec Security Association, SA, negotiation with the second network node. In some embodiments of this aspect, the trigger is a request message to establish an IPsec negotiation with the second network node. In some embodiments of this aspect, the trigger is a request message, from the second network node, to establish the IPsec SA negotiation with the second network node. In some embodiments of this aspect, the trigger is one of a request message, a request message from the second network node, a control plane message, an indication of an establishment of a radio session for the UE, and a radio bearer establishment message. In some embodiments of this aspect, the method further includes receiving, from the second network node, an IPsec packet, the IPsec packet associated with the UE and the IPsec packet including the indication of the SPI value; decrypting and authenticating the received IPsec packet using at least the indication of the SPI value; and communicating, to a third network node, the decrypted packet. In some embodiments of this aspect, the SPI value maps to IPsec traffic associated with the UE between the first network node and the second network node. In some embodiments of this aspect, deriving the unique identifier further comprises deriving the unique identifier for the UE based at least in part on data associated with the UE and, as a result of the derivation, the generation of the SPI value is based at least in part on the data associated with the UE. In some embodiments of this aspect, the data used to derive the unique identifier and generate the SPI value uniquely identifies IPsec traffic associated with the UE for IP-level filtering of traffic between the first network node and the second network node. In some embodiments of this aspect, the data used to derive the unique identifier for the UE and generate the SPI value includes at least one of a Cell UE Identifier, a Baseband Processing Function, BPF, Identifier, and a Cell Identifier. In some embodiments of this aspect, the data used to derive the unique identifier for the UE and generate the SPI value includes an identification of a radio bearer, RB, for the UE. In some embodiments of this aspect, the data used to derive the unique identifier for the UE and generate the SPI value is signalling data associated with the UE. In some embodiments of this aspect, the data associated with the UE is data corresponding to one of an Uplink, UL, channel and a Downlink, DL, channel for the UE. In some embodiments of this aspect, deriving the unique identifier further comprises deriving the unique identifier for the UE by concatenating the data associated with the UE. In some embodiments of this aspect, generating the SPI value further comprises generating the SPI value by inputting the unique identifier into an invertible function that returns a 32-bit value representing the SPI. In some embodiments of this aspect, the indication of the SPI value is one of a clear text SPI value and an obfuscated SPI value. In some embodiments of this aspect, the method further includes obfuscating the SPI value and the communication of the indication of the SPI value comprises a communication of the obfuscated SPI value. In some embodiments of this aspect, the obfuscating the SPI value further comprises obfuscating the SPI value by inputting at least the generated SPI value into a hash function. In some embodiments of this aspect, the obfuscating the SPI value further comprises obfuscating the SPI value by inputting the generated SPI value and a key value into a hash function to generate the obfuscated SPI value. In some embodiments of this aspect, the method further includes receiving, from the second network node, an IPsec packet, the IPsec packet including the indication of the SPI value; and decrypting and authenticating the received IPsec packet using at least the indication of the SPI value by: identifying the Security Association, SA, of the IPsec packet via the obfuscated SPI value; decrypting the IPsec packet according to the identified SA to obtain payload data of the IP packet; determining the unique identifier for the UE and the SPI value from the decrypted payload data; inputting a key value and the determined SPI value into a hash function; determining whether the hash function returns an output value that is equal to the obfuscated SPI value; and one of communicating the IP packet and dropping the IP packet based at least in part on whether the output value of the hash function is equal to the obfuscated SPI value. In some embodiments of this aspect, the method further includes communicating, to a security node, at least the indication of the SPI value for Internet Protocol, IP, -level filtering of IPsec traffic between the first network node and the second network node. In some embodiments of this aspect, the method further includes communicating, to the security node, a security action associated with the SPI value, the security action to be performed by the security node on IPsec traffic between the first network node and the second network node and the SPI value identifying the UE for the performance of the security action. In some embodiments of this aspect, the security action includes at least one of rate-limiting IPsec traffic associated with UE, accepting IPsec traffic associated with the UE, and rejecting IPsec traffic associated with the UE. In some embodiments of this aspect, the security node is a Layer 3 firewall for IPsec traffic between the first network node and the second network node. In some embodiments of this aspect, one of the second network node and the first network node comprises at least one virtualized radio function in a cloud data center and the other one of the second network node and the first network node comprises a baseband function. In some embodiments of this aspect, the at least one virtualized radio function is a base station centralized unit, CU, in the cloud data center and the baseband function is a base station distributed unit, DU.

According to yet another aspect, a security node is provided. The security node includes processing circuitry configured to observe Internet Protocol Security, IPsec, traffic between a first network node and a second network node; and filter the observed IPsec traffic based at least in part on an indication of a Security Parameter Index, SPI, value, the SPI value based at least in part on a unique identifier for a user equipment, UE, and the SPI value being unique to an IPsec session associated with the UE.

In some embodiments of this aspect, the processing circuitry is further configured to receive the indication of the SPI value from one of the first network node and the second network node and filter the observed IP traffic based at least in part on the received indication of the SPI value. In some embodiments of this aspect, the processing circuitry is further configured to receive a security action associated with the SPI value; identify IP traffic associated with a user equipment, UE, based at least in part on the indication of the SPI value; and filter the identified IP traffic associated with the UE according to the received security action. In some embodiments of this aspect, the security action includes at least one of rate-limiting IPsec traffic associated with UE, accepting IPsec traffic associated with the UE, and rejecting IPsec traffic associated with the UE. In some embodiments of this aspect, the processing circuitry is configured to filter the observed IPsec traffic based at least in part on the indication of the SPI value by being further configured to match SPI fields of the observed IPsec packets to the SPI value; and filter at least one IPsec packet based on whether an SPI field of the IPsec packet matches the SPI value. In some embodiments of this aspect, the security node is a Layer 3 firewall between the first network node and the second network node.

According to another aspect, a method for a security node is provided. The method comprises observing Internet Protocol Security, IPsec, traffic between a first network node and a second network node; and filtering the observed IPsec traffic based at least in part on an indication of a Security Parameter Index, SPI, value, the SPI value based at least in part on a unique identifier for a user equipment, UE, and the SPI value being unique to an IPsec session associated with the UE.

In some embodiments of this aspect, the method further includes receiving the indication of the SPI value from one of the first network node and the second network node and filtering the observed IP traffic based at least in part on the received indication of the SPI value. In some embodiments of this aspect, the method further includes receiving a security action associated with the SPI value; identifying IPsec traffic associated with a user equipment, UE, based at least in part on the indication of the SPI value; and filtering the identified IPsec traffic associated with the UE according to the received security action. In some embodiments of this aspect, the security action includes at least one of rate-limiting IPsec traffic associated with UE, accepting IPsec traffic associated with the UE, and rejecting IPsec traffic associated with the UE. In some embodiments of this aspect, the filtering the observed IPsec traffic based at least in part on the indication of the SPI value comprises matching SPI fields of the observed IPsec packets to the SPI value; and filtering at least one IPsec packet based on whether an SPI field of the IPsec packet matches the SPI value. In some embodiments of this aspect, the security node is a Layer 3 firewall between the first network node and the second network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1A:
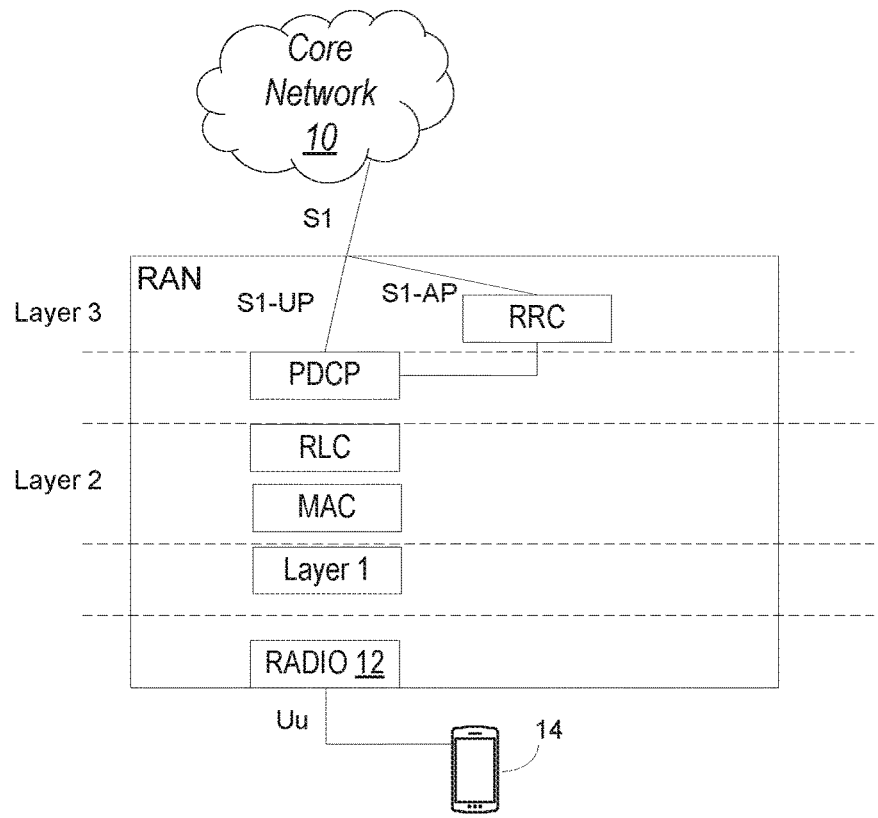
FIG. 1A is a block diagram illustrating an example vRAN architecture.
Figure 1B:
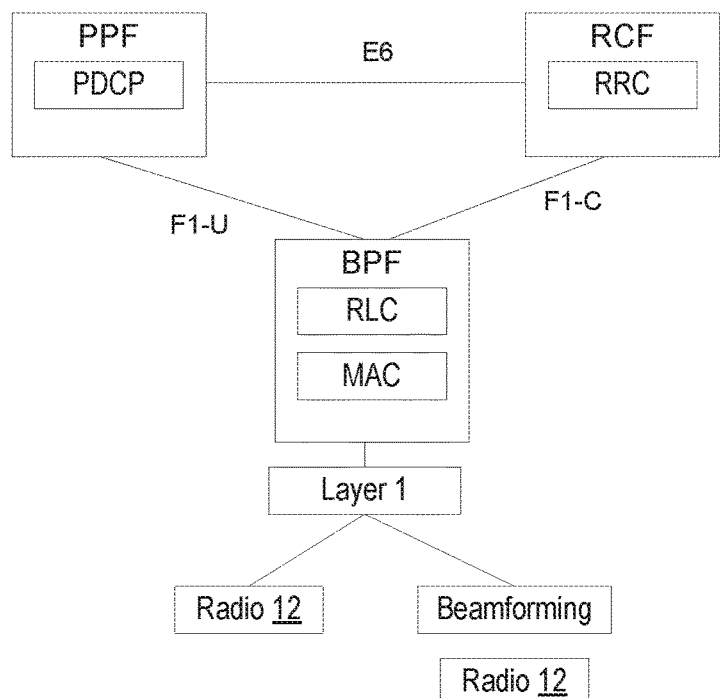
FIG. 1B is a block diagram illustrating yet another example vRAN architecture including exemplary vRAN interfaces.
Figure 2:
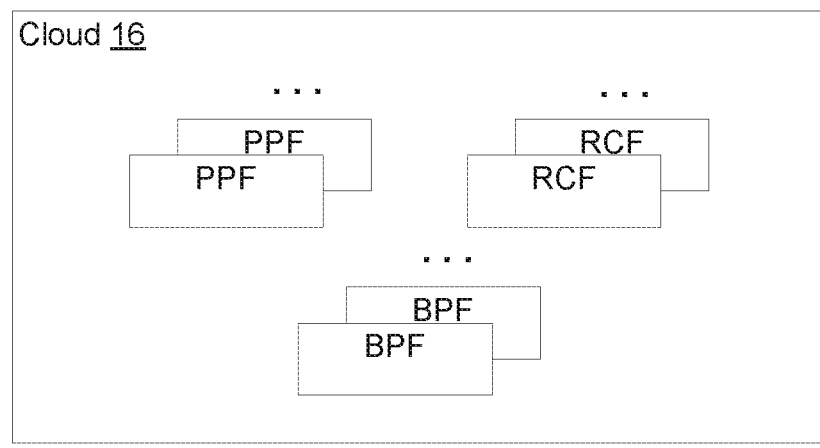
FIG. 2 is a block diagram illustrating an example of a vRAN resource pool.
Figure 3:
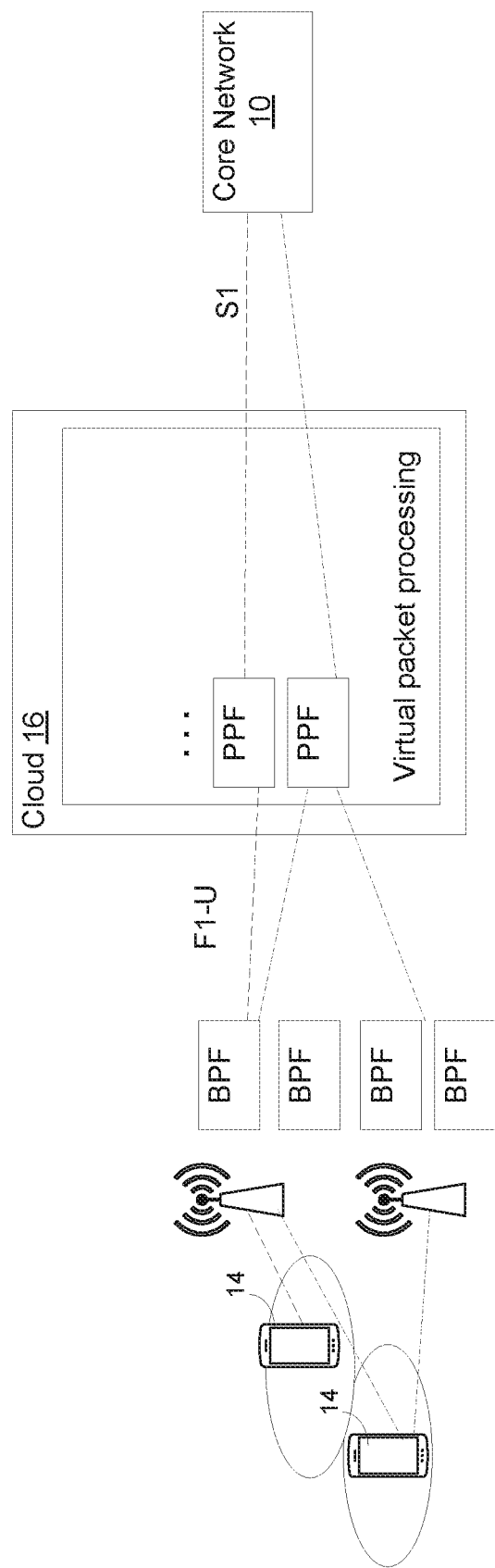
FIG. 3 is a block diagram illustrating an exemplary vRAN architecture in a mesh arrangement.

Enabling policy-based IP-level filtering to mitigate vRAN signalling storms, i.e., selectively rate limiting UE signalling sessions, can be challenging. At least some (incomplete) solutions that have been considered are discussed below. For example, if the radio-vRAN network leaves the underlying IP protocol unsecured (e.g., no IPsec or TLS), a deep inspection mechanism may be expected to infer UE IDs and basic signalling messages or signalling sessions directly from the IP packet payload. However, a deep packet inspection (DPI) may perform poorly compared to filtering the IP headers only. However, especially with PDCP encryption activated, distinguishing between the various signalling sessions can become complicated. Accordingly, management of the IP sessions may be implemented to carry the radio-to-vRAN traffic (e.g., the F1-C and F1-U data) between the vRAN entities (e.g., BPFs, RCFs, PPFs, etc.) by relying on a mechanism that maps radio bearers onto IP sessions. Currently, it is not clear the exact encapsulation of the vRAN entities (e.g., RCF and PPF PDUs) to implement a radio bearer to IP session mapping. In some embodiments, there may be a mapping for the PPF to associate the IP payload to a corresponding radio bearer.

For policy-based IP-level filtering, the solutions discussed above do not solve the case in which the radio—vRAN traffic is secured at the IP level with IPsec (unless the IPsec employs a null-cipher (i.e., no ciphering) to enable DPI). Implementing policy-based IP-level filtering or control (e.g., firewall throttling, rate limiting, redirection) on selected UE traffic directly on IPsec-encrypted IP traffic may have at least two primary advantages. Firstly, the control can be offloaded from the legacy vRAN functionalities and the core network CN (e.g., AMF, or MME). Secondly, reaction to signalling storms can be performed in a timelier manner, as compared to other solutions, and can be implemented through stateless firewalls.

Some of the problems with solutions that have been considered are discussed as follows. Signalling storm can be dealt with by throttling and rate limiting, implemented for example at the MME/AMF. However, such control is reactive—not proactive. Thus, vRAN or CN entities, as well as, their interfaces can be overloaded before the mitigation is even launched. Other proposals may include filtering on the interfaces, e.g., F1, or rate limiting over the newly introduced vRAN interfaces. However, filtering and/or rate limiting on the interfaces presents an insufficient solution. Specifically, if the encryption is activated over the inter-access sites (e.g., between the Hub-Site and Central office/ vRAN), UE signalling sessions cannot be distinguished in the IPsec tunnel due to encryption. Thus, with such solutions, filtering could be applied only after decrypting the traffic. Some proposals rely on PDCP encryption for the IP sessions between the vRAN entities (e.g., BPFs, RCFs, and PPFs). For example, a vRAN interface, such as, F1-U with IPsec null cipher may accept IP rate limiting by an IP (L3) firewall with DPI. Other proposals provide radio bearer to IP session mapping and rely on the PDCP protection, which can be sufficient between the entities implementing a split-Long Term Evolution (LTE) stack (e.g., the so-called residential gateway and the small cells) in residential small cells where there is most probably a single administration domain. In such environments, IPsec may not be required; therefore, that type of mapping could help in implementing rate limiting and signalling storm mitigation.

Another solution where IPsec may be activated involves using IP version 6 (IPv6) flow labels to encode different UE data based on which rate limiting can be applied. In Encapsulating Security Payload (ESP) tunnel mode, such solution could include, for example, rewriting IPv6 labels (e.g., a classifier or router on-path between the LTE-split entities could modify the IPv6 labels to a unique value). If such routing is based on labels, there may be a vulnerability to DDoS attacks because instead of distributing the load between the different vRAN entities such as, for example, PPFs (e.g., in UL), one PPF or RCF could become overloaded with UEs. Additionally, if the access control is put in place based on IPv6 labels, many UEs could be filtered wrongly if the initial assigned labels are changed on-path. Thus, solutions in which the traffic is IPsec-encrypted, including ESP tunnel mode, and where control over the encapsulated sessions is performed directly on the encrypted traffic, are left as open problems.

Accordingly, the present disclosure provides for a solution to enable policy-based IP-level filtering (e.g., IP level control) in IPsec protected vRAN that can, for example, be used as a mitigation of signalling storms. The present disclosure considers that the various location sites for the access network (e.g., baseband (BB) sites and vRAN sites) may be geographically distributed with inter-network traffic and may cross domains under different security administration responsibilities. Thus, security protections, and, in particular, IPsec protection (e.g., ESP tunnel mode) may be required for each baseband-to-vRAN interface (e.g., each BPF-RCF (e.g., F1-C) interface, BPF-PPF (F1-U) interface, BPF-BPF (e.g., E5) interface, etc. may be IPsec ESP protected).

For the sake of simplicity and clarity, the examples discussed in the present disclosure are discussed primarily with respect to uplink (UL) transmissions from the UE to the RAN, e.g., the network node. However, it should be understood that the principles disclosed may also be beneficial for downlink (DL) transmissions from the RAN, e.g., network node, towards the UE. Control activated on, for example, the signalling data according to examples in the disclosure may impact both UL and DL.

Some embodiments of the disclosure provide that, at a UE connection, one unique identifier (ID) may be derived based on one or more UE ID(s) at a vRAN site. In some embodiments, for a dual-connected (DC) UE, two unique IDs may be derived. The derived ID may uniquely and globally identify a UE and/or traffic associated with the UE. The derived ID may serve to encode the Security Parameter Index (SPI) of the IPsec session (e.g., IPsec UL session) between, for example, a baseband function (e.g., BPF, gNB-DU, DU) and a vRAN site (e.g., RCF, gNB-CU-CP, CU), and/or between two secure gateways of these sites. Simple access control IP firewall rules (L3 FW) may thus be derived based on such SPIs to be used in mitigation policies of signalling storms in vRAN. For example, in some embodiments, an L3 firewall may filter based on L3 firewalling rules matching the SPI field in the IPsec header.

Advantageously, some embodiments of the present disclosure may provide for simple/efficient access to UE signalling sessions directly on IPsec ESP mode tunnels; mitigation outside the legacy baseband and vRAN 5G entities; and/or offloaded control.

Some embodiments of the present disclosure may provide a new security function for vRAN that is useful for other security controls and extensible to the user-plane. Some embodiments of the present disclosure enforce security policies over encrypted traffic between vRAN entities, such as, for example, a baseband function (e.g., gNB-DU) and a radio control function (e.g., gNB-CU-CP).

Some embodiments of the present disclosure are applied on protected traffic and do not introduce additional threats. In some embodiments, the present disclosure provides for IPsec level filtering, without exposing the packet information to a passive listener sniffing traffic between the entities (e.g., between BPF (e.g., gNB-DU) and the RCF (e.g., gNB-CU-CP)).

Some embodiments of the present disclosure enable a third-party entity to filter traffic while not revealing the content of the traffic or the security policies. In some embodiments, the solution in the present disclosure may be considered filtering based on filtering opaque values of the SPI. In some embodiments, the filtering entity may apply the security policies based on the inner packet information. In this case, the disclosure may be considered a type of shared secret shared between a RAN entity (e.g., RCF, BPF) and the filtering entity (e.g., a firewall).

Some embodiments of the disclosure advantageously present a mechanism to obfuscate the information from a passive listener, while such information is being shared between trusted parties. Additional mechanisms may be considered in the future depending on requirements for cryptographic performance and robustness.

Advantageously, some embodiments of the disclosure provide an efficient arrangement to enforce security policies by exposing the information that is useful for the filtering function into a standard field in the IP header. This may be sufficient to not require deep packet inspection (DPI) of the complete packet in order to identify and filter the packet.

Some embodiments of the disclosure provide an arrangement for the vRAN entities (e.g., BPF and PPF) to agree (e.g., according to pre-defined rules) on the fields to be used to encode the SPI value. Such fields used to encode the SPI value may be selected based on usefulness for enforcing the filtering security policies in an accurate and efficient manner. In addition to signalling storm mitigation in vRAN, other use cases may benefit from the principles in the present disclosure. For example, there may be other use cases identified where UE traffic may be discharged close to the radio site, which is the case, e.g., for blacklisted UEs. Furthermore, new 5G industrial use cases may require more control over IoT devices in various contexts (as compared to current control techniques for IoT devices), such as temporal contexts. For example, relying on the security services of an Access Provider, an IoT Service Provider might require from the Access Provider to enforce access control on the managed IoT devices during certain time intervals (i.e., temporal context) if the signalling load reaches certain thresholds (e.g., allow only N devices to connect during Delta units of time).

Before describing in detail exemplary embodiments, it is noted that the embodiments reside primarily in combinations of apparatus components and processing steps related to IPsec communications, such as, for example, secured vRAN and/or signalling storm mitigation in secured RAN. Note that although terminology from and/or relating to one particular type of network, such as, for example, vRAN networks may be used in this disclosure, this should not be seen as limiting the scope of the disclosure to only those types of networks and nodes. Other networks and/or nodes where IPsec communications are used may also benefit from exploiting the principles covered and features described in this disclosure. Also, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signalling, infrared signalling or optical signalling, for example. One having ordinary skill in the art will appreciate that multiple components may interoperate and modifications and variations are possible of achieving the electrical and data communication.

In some embodiments a more general term "network node" is used and it can correspond to any type of radio network node or any node, which communicates with a wireless device and/or with another network node, directly or indirectly. In some embodiments, the network node may refer to a device or functionality implemented in a device that is associated with a base station, such as a gNB, and may be located in a cloud data center site, or at the antenna site. Examples of network nodes are BPF, RCF and/or PPF. The BPF may also be known as, or more generally referred to herein as the baseband function, distributed unit (DU), base station distributed unit, baseband distributed unit, etc. The BPF may be, for example, a gNB-DU. A network node may be a virtualized access network entity, such as, for example, the packet processing function (PPF) and/or the radio control function (RCF). The RCF may also be known as, or more generally referred to herein as the radio function, virtualized radio function, centralized unit (CU), and base station centralized unit.

The RCF may be, for, example, gNB-CU and/or gNB-CU-Control Plane (CP). PPF may be, for example, gNB-CU-User Plane (UP). In some embodiments, the network node may refer to a device, and/or functionality implemented in a device, and/or an instance of a pooled vRAN function at a data center site/cloud that facilitates RAN services and connectivity (e.g., gNB-CU-CP, gNB-CU-UP, gNB-DU, etc.).

Other examples of network nodes are NodeB, master eNB (MeNB), secondary eNB (SeNB), gNode B (gNB), a network node belonging to master cell group (MCG) or a secondary cell group (SCG), base station (BS), multi-standard radio (MSR) radio node such as a (multi-standard radio) MSR BS, eNodeB, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g. mobile switching center (MSC), mobile management entity (MME), etc.), operation and maintenance (O&M), operations support system (OSS), self-organizing network (SON), positioning node (e.g., evolved serving mobile location center (E-SMLC)), minimization of drive test (MDT) node, etc.

In some embodiments the non-limiting terms user equipment (UE) and wireless device (WD) are used interchangeably. The UE (or WD) herein can be any type of wireless device capable of communicating with a network node or another UE over radio signals. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" may be used. It can be any kind of a radio network node which may comprise any of base station, radio base station, base transceiver station, base station controller, network controller, radio network controller (RNC), evolved Node B (eNB), Node B, gNB, Multi-cell/multicast Coordination Entity (MCE), relay node, access point, radio access point, Remote Radio Unit (RRU), Remote Radio Head (RRH).

In some embodiments, the general term "virtualized radio function" may be used to indicate an RCF, gNB-CU-CP, a base station CU, or other virtualized radio control function that may be remotely implemented at a data center site.

In some embodiments, the general term "baseband function" may be used to indicate a BPF, gNB-DU, base station DU, or other baseband processing function that may be implemented at or near an antenna site, or at least closer to an antenna site than a virtualized RAN entity at a data center site.

Even though the descriptions herein may be explained in the context of one of a Downlink (DL) and an Uplink (UL) communication, it should be understood that the basic principles disclosed may also be applicable to the other of the one of the DL and the UL communication. Transmitting in downlink may pertain to transmission from the network or network node to the terminal. The terminal may be considered the WD or UE. Transmitting in uplink may pertain to transmission from the terminal to the network or network node. Uplink and downlink may be considered communication directions.

Although the description herein may be explained in the context of a particular channel, such as an UL channel, it should be understood that the principles may also be applicable to other channels.

An indication generally may explicitly and/or implicitly indicate the information it represents, corresponds to and/or indicates. Implicit indication may for example be based on, for example, a known association or correlation. Explicit indication may for example be based on a specific message and/or request, and/or one or more index or indices corresponding to a table, and/or one or more bit patterns representing the information.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be communicated on different carriers and/or different interfaces and/or wired or wireless connections and/or be associated to different signaling processes, e.g., representing and/or pertaining to one or more such processes and/or corresponding information. An indication may comprise signaling, and/or a plurality of signals and/or messages, which may be communicated on different carriers and/or different interfaces and wired or wireless connections.

Any two or more embodiments described in this disclosure may be combined in any way with each other.

Figure 4:
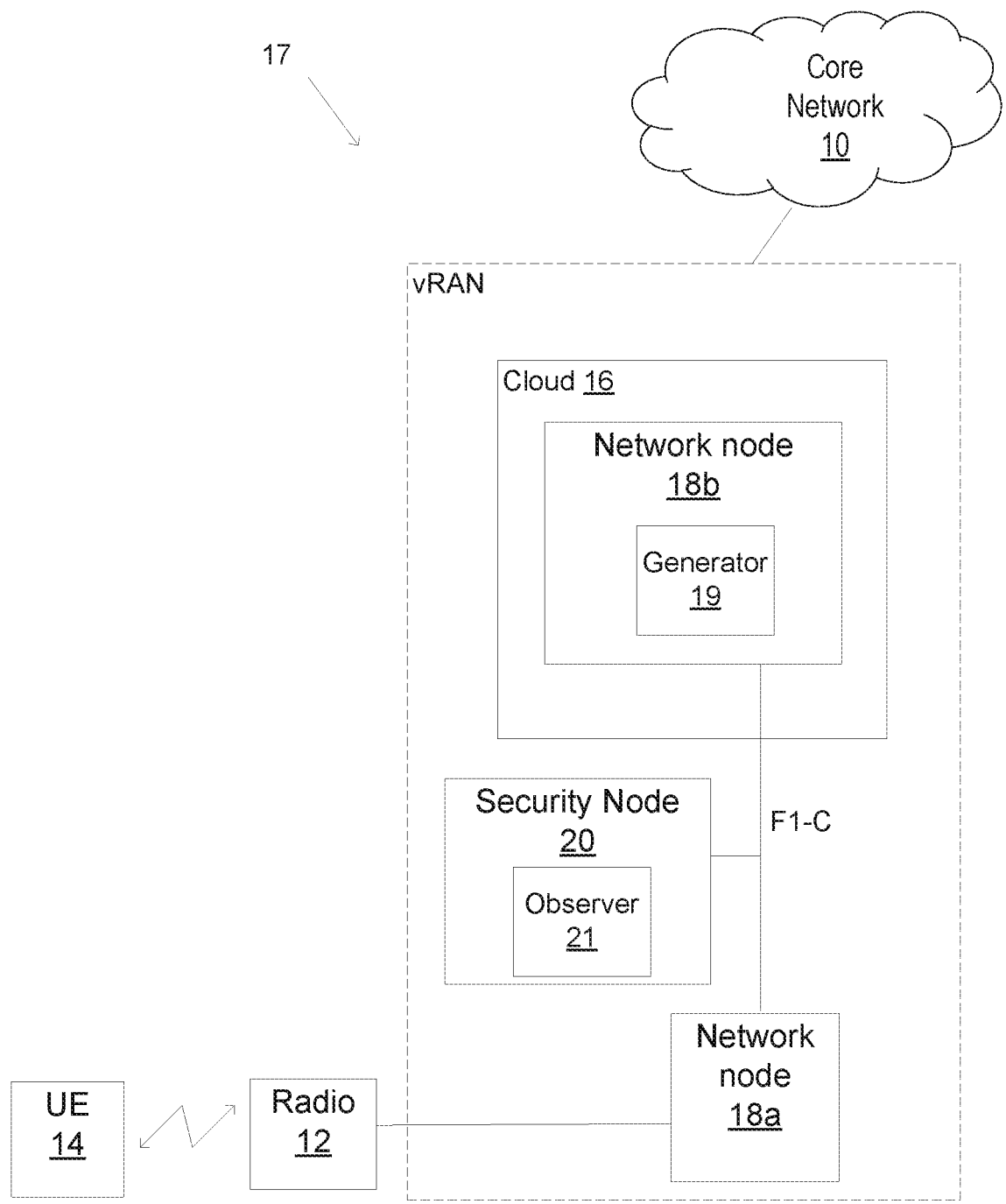
FIG. 4 is a block diagram of an exemplary communication system in accordance with an embodiment of the present disclosure.

Returning to the drawing figures, in which like elements are referred to by like reference designators, there is shown in FIG. 4 a block diagram of a communication network 17 constructed according to at least some of the principles set forth in this disclosure. The communication network 17 includes the core network 10 and the cloud 16 which may include the Internet and/or the public switched telephone network (PSTN). The communication network 17 includes one or more network nodes such as a first network node 18a and a second network node 18b, which may communicate via interface, such as, for example, an F1 interface. The communication network 17 includes a radio 12 in communication with the network node 18a. The network nodes 18a and 18b may be referred to collectively as network nodes 18. It is contemplated that additional and/or different interfaces can be used for the communication between network nodes 18. The network node 16 may include a generator 18, which may be configured to perform one or more of the processes described herein for the network node 18, such as generating an SPI value based at least in part on a unique UE identifier (ID). The communication network 17 may also include a security node 20, which may be a firewall or filtering node, between the first network node 18a and the second network node 18b. The security node 20 may include an observer 21, which may be configured to perform one or more of the processes described herein for the security node 20, such as filtering IPsec traffic based at least in part on an SPI value that is unique to an IPsec session for a UE 14. The network nodes 18 may serve user equipments (UEs) 14, referred to collectively herein as UE 14. Note that, although only one UE 14 and two network nodes 18 are shown for convenience, the communication network 17 may typically include many more UEs 14 and network nodes 18. The communication network 17 may include other nodes, connections and interfaces that are not depicted in FIG. 4 for clarity and for ease of understanding.

Some embodiments of the present disclosure are described with respect to communications between the first network node 18a and the second network node 18b. It should be understood that although "first" and "second" are used to identify network nodes 18a and 18b, respectively, such terms are used solely to distinguish one entity or element from another entity or element, without necessarily requiring or implying any physical or logical relationship or order between such entities or elements. Further, a network node 18 configured to perform the processes described herein with respect to the first network node 18a in certain scenarios may also be configured to perform the processes described herein with respect to the second network node 18b in other scenarios. For example, the generator 19 may also be included in the network node 18a.

Figure 5:
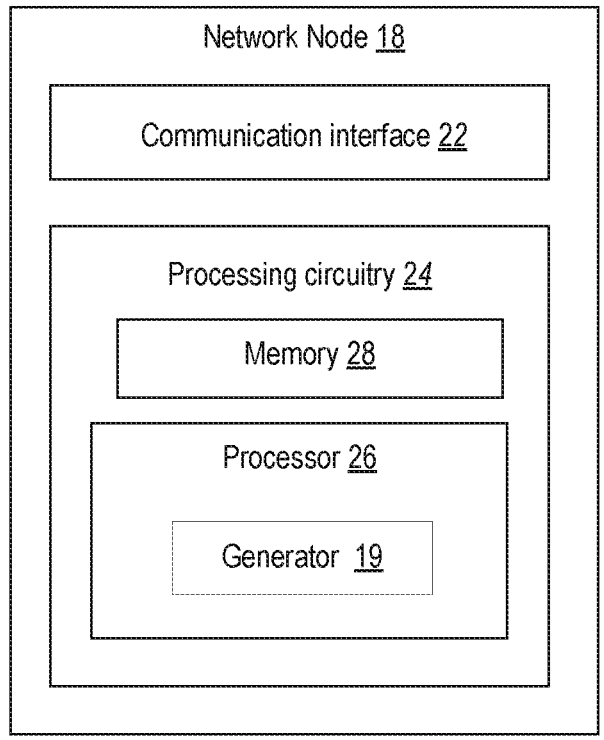
FIG. 5 is a block diagram of a network node in accordance with the principles of the present disclosure.

FIG. 5 is a block diagram of an embodiment of the network node 18 constructed in accordance with principles set forth herein. The network node 18 includes a communication interface 22 for setting up and maintaining a wired or wireless connection with an interface of a different communication device of the communication network 17. The communication interface 22 may include a radio interface for setting up and maintaining at least a wireless connection with a UE 14 located in a coverage area served by the network node 18. The radio interface may be formed as or may include, for example, one or more RF transmitters, one or more RF receivers, and/or one or more RF transceivers. The communication interface 22 may be configured to facilitate a wired and/or optical connection (e.g., F1) such as an IP connection or an IPsec connection with another node that may be at a data center site in the cloud 16.

The network node 18 may also include processing circuitry 24. The processing circuitry 24 may include a processor 26 and a memory 28. In particular, in addition to or instead of a processor, such as a central processing unit, and memory, the processing circuitry 24 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 26 may be configured to access (e.g., write to and/or read from) the memory 28, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

The network node 18 may further have software stored internally in, for example, memory 28, or stored in external memory (e.g., database, storage array, network storage device, etc.) accessible by the network node 18 via an external connection. The software may be executable by the processing circuitry 24. The processing circuitry 24 may be configured to control any of the methods and/or processes described herein and/or to cause such methods, and/or processes to be performed, e.g., by network node 18. Processor 26 corresponds to one or more processors 26 for performing network node 18 functions described herein. The memory 28 is configured to store data, programmatic software code and/or other information described herein. In some embodiments, the software may include instructions that, when executed by the processor 26 and/or processing circuitry 24, causes the processor 26 and/or processing circuitry 24 to perform the processes described herein with respect to network node 18. For example, processing circuitry 24 of a first network node 18*a* may include the generator 19, which may be configured to receive a trigger to establish an Internet Protocol Security, IPsec, session with a second network node 18*b*, the IPsec session being associated with a user equipment, UE 14. The processing circuitry 24 may be configured to, responsive to the trigger to establish the IPsec session associated with the UE 14, derive a unique identifier for the UE 14. The processing circuitry 24 may be configured to generate a Security Parameter Index, SPI, value based at least in part on the unique identifier derived for the UE 14, the SPI value being unique to the IPsec session. The processing circuitry 24 may be configured to communicate (via e.g., communication interface 22) an indication of the SPI value to the second network node 18*b*.

In some embodiments, establishing the IPsec session with the second network node 18*b* comprises an IPsec Security Association, SA, negotiation with the second network node 18*b*. In some embodiments, the trigger is associated with the IPsec SA negotiation with the second network node 18*b*. In some embodiments, the trigger is a request message, from the second network node 18*b*, to establish the IPsec SA negotiation with the second network node 18*b*. In some embodiments, the trigger is one of a request message, a request message from the second network node 18*b*, a control plane message, an indication of an establishment of a radio session for the UE 14, and a radio bearer establishment message. In some embodiments, the processing circuitry 24 is further configured to receive (via e.g., communication interface 22), from the second network node 18*b*, an IPsec packet, the IPsec packet associated with the UE 14 and the IPsec packet including the indication of the SPI value; decrypt and authenticate the received IPsec packet using at least the indication of the SPI value; and communicate, to a third network node (e.g., PPF, gNB-CU-UP) and/or the core network 10, the decrypted packet.

In some embodiments, the SPI value maps to IPsec traffic associated with the UE 14 between the first network node 18*a* and the second network node 18*b*. In some embodiments, the processing circuitry 24 is further configured to derive the unique identifier for the UE 14 based at least in part on data associated with the UE 14 and, as a result of the derivation, the generation of the SPI value is based at least in part on the data associated with the UE 14. In some embodiments, the data used to derive the unique identifier and generate the SPI value uniquely identifies IPsec traffic associated with the UE 14 for IP-level filtering of traffic between the first network node 18*a* and the second network node 18*b*. In some embodiments, the data used to derive the unique identifier for the UE 14 and generate the SPI value includes at least one of a Cell UE Identifier, a Baseband Processing Function, BPF, Identifier, and a Cell Identifier. In some embodiments, the data used to derive the unique identifier for the UE 14 and generate the SPI value includes an identification of a radio bearer, RB, for the UE 14. In some embodiments, the data used to derive the unique identifier for the UE 14 and generate the SPI value is signalling data associated with the UE 14. In some embodiments, the data associated with the UE 14 is data corresponding to one of an Uplink, UL, channel and a Downlink, DL, channel for the UE. In some embodiments, the processing circuitry 24 is further configured to derive the unique identifier for the UE 14 by concatenating the data associated with the UE 14. In some embodiments, the processing circuitry 24 is further configured to generate the SPI value by inputting the unique identifier into an invertible function that returns a 32-bit value representing the SPI. In some embodiments, the indication of the SPI value is one of a clear text SPI value and an obfuscated SPI value. In some embodiments, the processing circuitry 24 is further configured to obfuscate the SPI value and the communication of the indication of the SPI value is a communication of the obfuscated SPI value to the second network node 18*b*. In some embodiments, the processing circuitry 24 is configured to obfuscate the SPI value by being further configured to input at least the generated SPI value into a hash function. In some embodiments, the processing circuitry 24 is configured to obfuscate the SPI value by being further configured to input the generated SPI value and a key value into a hash function to generate the obfuscated SPI value. In some embodiments, the processing circuitry 24 is configured to receive, from the second network node 18*b*, an IPsec packet, the IPsec packet including the indication of the SPI value. In some embodiments, the processing circuitry 24 is configured to decrypt and authenticate the received IPsec packet using at least the indication of the SPI value by being further configured to identify a Security Association, SA, of the IPsec packet via the obfuscated SPI value; decrypt the IPsec packet according to the identified SA to obtain payload data of the decrypted packet; determine the unique identifier for the UE 14 and the SPI value from the decrypted payload data; input a key value and the determined SPI value into a hash function; determine whether the hash function returns an output value that is equal to the obfuscated SPI value; and one of communicate the decrypted packet (via e.g., the communication interface 22) and drop the decrypted packet based at least in part on whether the output value of the hash function is equal to the obfuscated SPI value. In some embodiments, the processing circuitry 24 is further configured to communicate, to a security node 20, at least the indication of the SPI value for Internet Protocol, IP, -level filtering of IPsec traffic between the first network node 18*a* and the second network node 18*b*. In some embodiments, the processing circuitry 24 is further configured to communicate, to the security node 20, a security action associated with the SPI value, the security action to be performed by the security node 20 on IPsec traffic between the first network node 18*a* and the second network node 18*b* and the SPI value identifying the UE 14 for the performance of the security action. In some embodiments, the security action includes at least one of rate-limiting IPsec traffic associated with UE, accepting IPsec traffic associated with the UE, and rejecting IPsec traffic associated with the UE 14. In some embodiments, the security node 20 is a Layer 3 firewall for Internet Protocol, IP, traffic between the first network node 18*a* and the second network node 18*b*. In some embodiments, one of the second network node 18*b* and the first network node 18*a* comprises at least one virtualized radio function in a cloud 16 data center and the other one of the second network node 18*b* and the first network node 18*a* comprises a baseband function. In some embodiments, the at least one virtualized radio function is a base station centralized unit, CU, in the cloud 16 data center and the baseband function is a base station distributed unit, DU.

Figure 6:
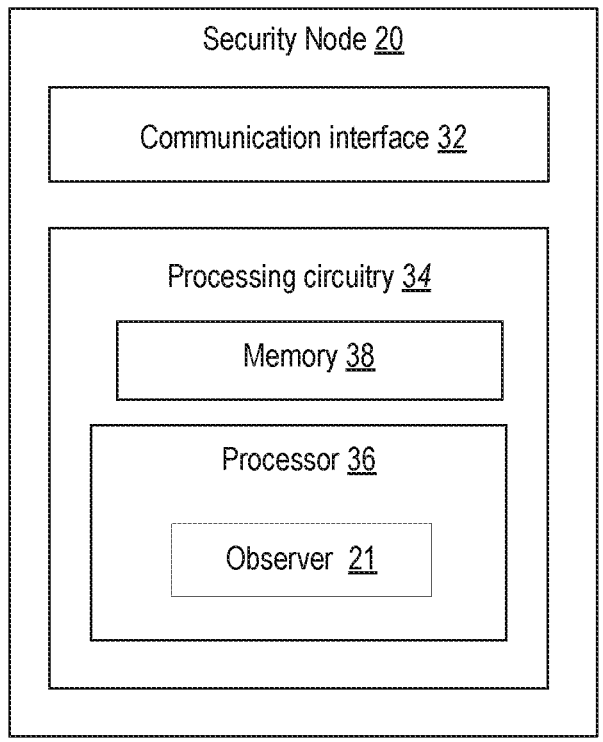
FIG. 6 is a block diagram of a security node in according with the principles of the present disclosure.

FIG. 6 is a block diagram of an embodiment of the security node 20 constructed in accordance with principles set forth herein. The security node 20 includes a communication interface 32 for communicating over a wired or wireless connection with an interface of a different communication device of the communication network 17. The communication interface 32 may include a radio interface for setting up and maintaining at least a wireless connection with another communication device of the communication network 17. The radio interface may be formed as or may include, for example, one or more RF transmitters, one or more RF receivers, and/or one or more RF transceivers. The communication interface 22 may be configured to facilitate a wired and/or optical connection such as an IP connection or an IPsec connection with another node, which may be at a data center site in the cloud 16.

The security node 20 may also include processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

The security node 20 may further have software stored internally in, for example, memory 38, or stored in external memory (e.g., database, storage array, network storage device, etc.) accessible by the security node 20 via an external connection. The software may be executable by the processing circuitry 34. The processing circuitry 34 may be configured to control any of the methods and/or processes described herein and/or to cause such methods, and/or processes to be performed, e.g., by security node 20. Processor 36 corresponds to one or more processors 36 for performing security node 20 functions described herein. The memory 38 is configured to store data, programmatic software code and/or other information described herein. In some embodiments, the software may include instructions that, when executed by the processor 36 and/or processing circuitry 34, causes the processor 36 and/or processing circuitry 34 to perform the processes described herein with respect to security node 20. For example, processing circuitry 34 may include the observer 21 configured to observe Internet Protocol Security, IPsec, traffic between a first network node 18a and a second network node 18b. The observer 21 may be configured to filter the observed IPsec traffic based at least in part on an indication of a Security Parameter Index, SPI, value, the SPI value based at least in part on a unique identifier for a user equipment, UE, 14 and the SPI value being unique to an IPsec session associated with the UE 14.

In some embodiments, the processing circuitry 34 is further configured to receive the indication of the SPI value from one of the first network node 18a and the second network node 18b and filter the observed IP traffic based at least in part on the received indication of the SPI value. In some embodiments, the processing circuitry 34 is further configured to receive a security action associated with the SPI value; identify IP traffic associated with a user equipment, UE, 14 based at least in part on the indication of the SPI value; and filter the identified IP traffic associated with the UE 14 according to the received security action. In some embodiments, the security action includes at least one of rate-limiting IPsec traffic associated with UE 14, accepting IPsec traffic associated with the UE 14, and rejecting IPsec traffic associated with the UE 14. In some embodiments, the processing circuitry 34 is configured to filter the observed IPsec traffic based at least in part on the indication of the SPI value by being further configured to match SPI fields of the observed IPsec packets to the SPI value; and filter at least one IPsec packet based on whether an SPI field of the IPsec packet matches the SPI value. In some embodiments, the security node 20 is a Layer 3 firewall between the first network node 18a and the second network node 18b.

Figure 7:
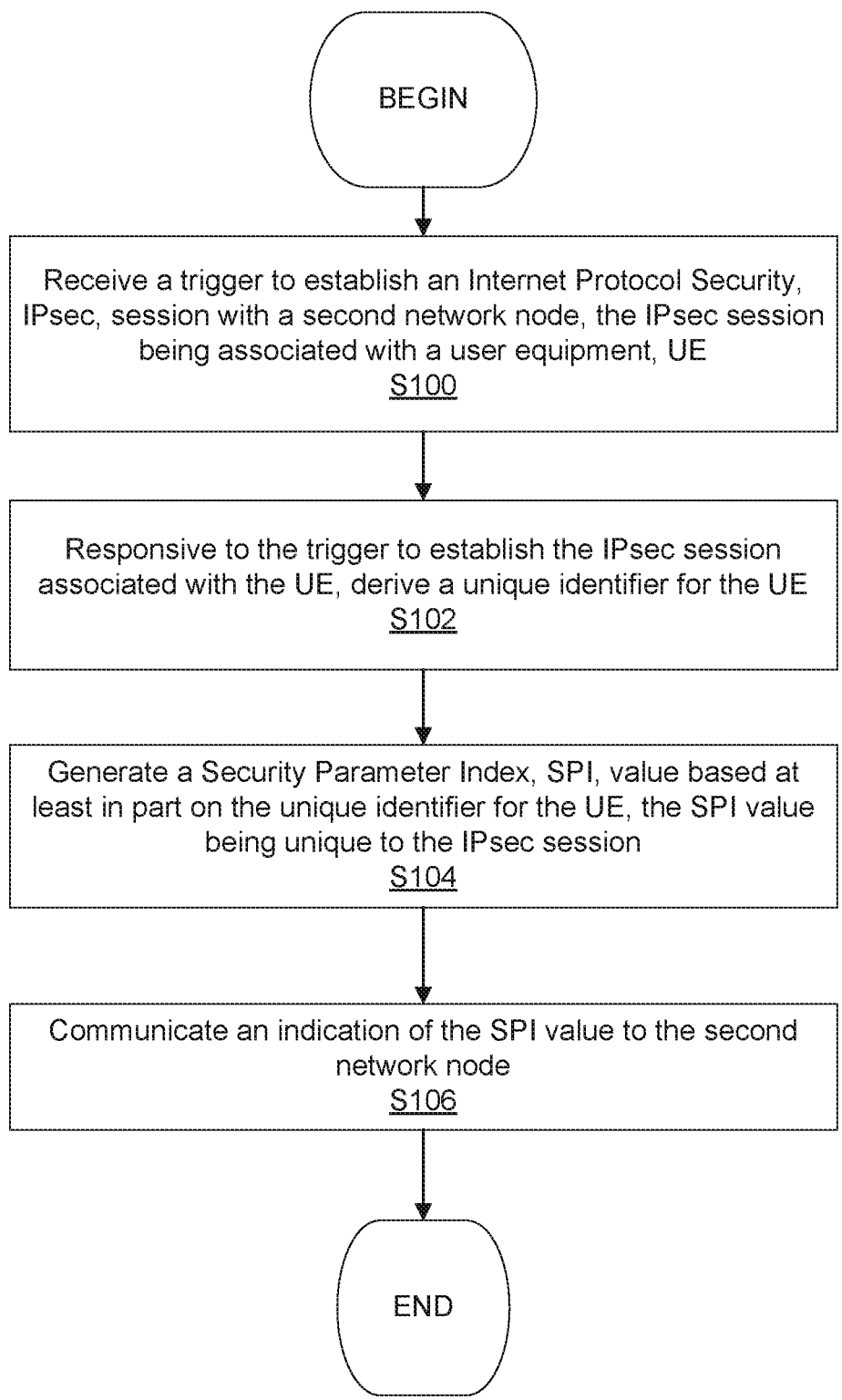
FIG. 7 is a flowchart of an exemplary process in a network node according to the principles of the present disclosure.

FIG. 7 is a flowchart of an exemplary process in a network node 18, such as, for example the first network node 18a. The process includes receiving a trigger to establish an Internet Protocol Security, IPsec, session with a second network node 18b, the IPsec session being associated with a user equipment, UE 14 (block S100). The process includes, responsive to the trigger to establish the IPsec session associated with the UE 14, deriving a unique identifier for the UE 14 (block S102). The process includes generating a Security Parameter Index, SPI, value based at least in part on the unique identifier for the UE 14, the SPI value being unique to the IPsec session (block S104). The process includes communicating an indication of the SPI value to the second network node 18b (block S106).

In some embodiments, the establishing the IPsec session with the second network node 18b comprises an IPsec Security Association, SA, negotiation with the second network node 18b. In some embodiments, the trigger is associated with the IPsec SA negotiation with the second network node 18b. In some embodiments, the trigger is a request message, from the second network node 18b, to establish the IPsec SA negotiation with the second network node 18b. In some embodiments, the trigger is one of a request message, a request message from the second network node 18b, a control plane message, an indication of an establishment of a radio session for the UE 14, and a radio bearer establishment message. In some embodiments, the process further includes receiving, from the second network node 18b, an IPsec packet, the IPsec packet associated with the UE 14 and the IPsec packet including the indication of the SPI value; decrypting and authenticating the received IPsec packet using at least the indication of the SPI value; and communicating, to a third network node, the decrypted packet. In some embodiments, the SPI value maps to IPsec traffic associated with the UE 14 between the first network node 18a and the second network node 18b. In some embodiments, deriving the unique identifier further comprises deriving the unique identifier for the UE 14 based at least in part on data associated with the UE 14 and, as a result of the derivation, the generation of the SPI value is based at least in part on the data associated with the UE 14. In some embodiments, the data used to derive the unique identifier and generate the SPI value uniquely identifies IPsec traffic associated with the UE 14 for IP-level filtering of traffic between the first network node 18a and the second network node 18b.

In some embodiments, the data used to derive the unique identifier for the UE 14 and generate the SPI value includes at least one of a Cell UE Identifier, a Baseband Processing Function, BPF, Identifier, and a Cell Identifier. In some embodiments, the data used to derive the unique identifier for the UE 14 and generate the SPI value includes an identification of a radio bearer, RB, for the UE 14. In some embodiments, the data used to derive the unique identifier for the UE 14 and generate the SPI value is signalling data associated with the UE 14. In some embodiments, the data associated with the UE 14 is data corresponding to one of an Uplink, UL, channel and a Downlink, DL, channel for the UE 14. In some embodiments, deriving the unique identifier further comprises deriving the unique identifier for the UE 14 by concatenating the data associated with the UE 14. In some embodiments, generating the SPI value further comprises generating the SPI value by inputting the unique identifier into an invertible function that returns a 32-bit value representing the SPI. In some embodiments, the indication of the SPI value is one of a clear text SPI value and an obfuscated SPI value. In some embodiments, the process further includes obfuscating the SPI value and the communication of the indication of the SPI value comprises a communication of the obfuscated SPI value. In some embodiments, the obfuscating the SPI value further comprises obfuscating the SPI value by inputting at least the generated SPI value into a hash function.

In some embodiments, the obfuscating the SPI value further comprises obfuscating the SPI value by inputting the generated SPI value and a key value into a hash function to generate the obfuscated SPI value. In some embodiments, the process further includes receiving, from the second network node 18*b*, an IPsec packet, the IPsec packet including the indication of the SPI value; and decrypting and authenticating the received IPsec packet using at least the indication of the SPI value by: identifying the Security Association, SA, of the IPsec packet via the obfuscated SPI value; decrypting the IPsec packet according to the identified SA to obtain payload data of the IP packet; determining the unique identifier for the UE 14 and the SPI value from the decrypted payload data; inputting a key value and the determined SPI value into a hash function; determining whether the hash function returns an output value that is equal to the obfuscated SPI value; and one of communicating the IP packet and dropping the IP packet based at least in part on whether the output value of the hash function is equal to the obfuscated SPI value. In some embodiments, the process further includes communicating, to a security node 20, at least the indication of the SPI value for Internet Protocol, IP, -level filtering of IPsec traffic between the first network node 18*a* and the second network node 18*b*.

In some embodiments, the process further includes communicating, to the security node 20, a security action associated with the SPI value, the security action to be performed by the security node 20 on IPsec traffic between the first network node 18*a* and the second network node 18*b* and the SPI value identifying the UE 14 for the performance of the security action. In some embodiments, the security action includes at least one of rate-limiting IPsec traffic associated with UE 14, accepting IPsec traffic associated with the UE 14, and rejecting IPsec traffic associated with the UE 14. In some embodiments, the security node 20 is a Layer 3 firewall for IPsec traffic between the first network node 18*a* and the second network node 18*b*. In some embodiments, one of the second network node 18*b* and the first network node 18*a* comprises at least one virtualized radio function in a cloud 16 data center and the other one of the second network node 18*b* and the first network node 18*a* comprises a baseband function. In some embodiments, the at least one virtualized radio function is a base station centralized unit, CU, (e.g., gNB-CU) in the cloud 16 data center and the baseband function is a base station distributed unit, DU (e.g., gNB-DU).

Figure 8:
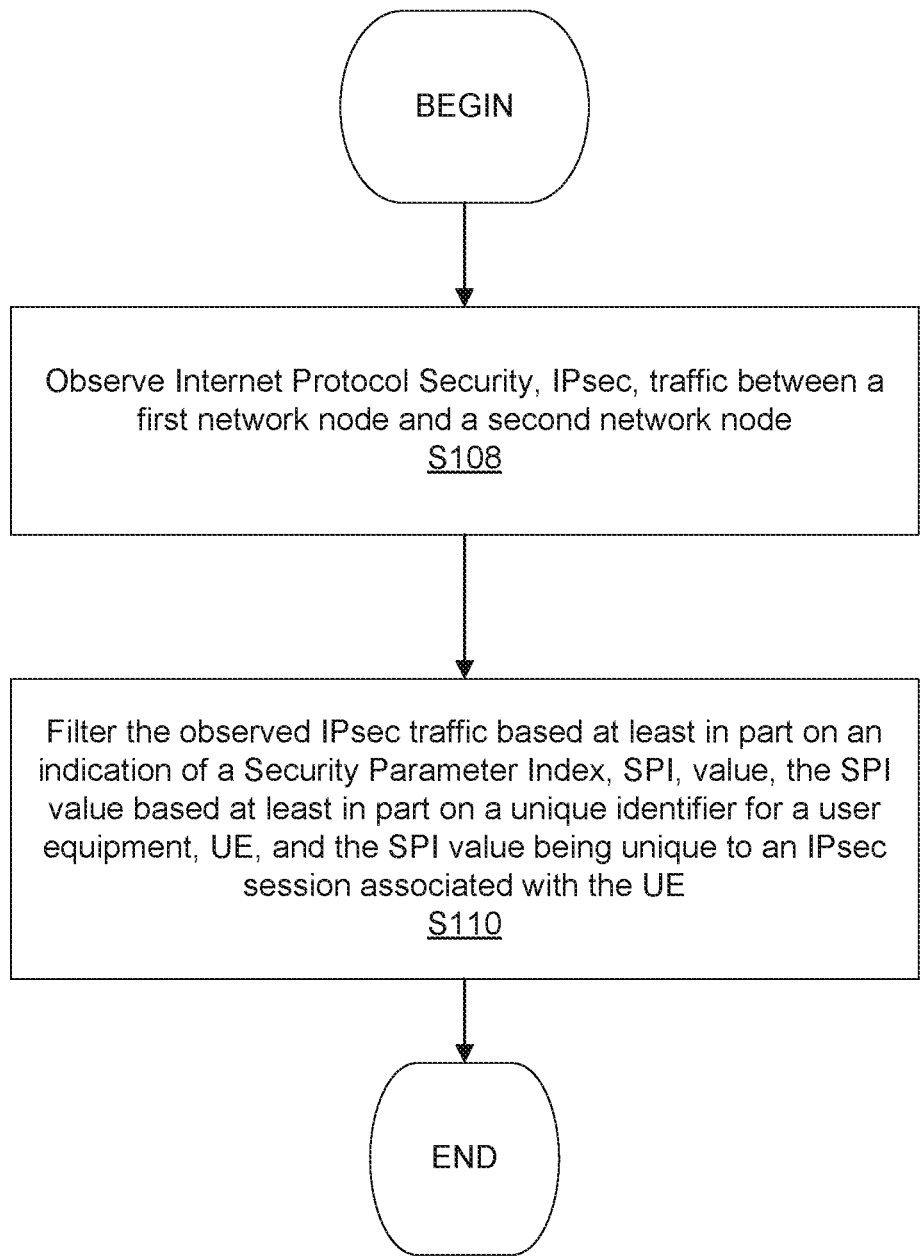
FIG. 8 is a flowchart of an exemplary process in a security node according to the principles of the present disclosure.

FIG. 8 is a flowchart of an exemplary process in a security node 20. The process includes observing Internet Protocol Security, IPsec, traffic between a first network node 18*a* and a second network node 18*b* (block S108). The process includes filtering the observed IPsec traffic based at least in part on an indication of a Security Parameter Index, SPI, value, the SPI value based at least in part on a unique identifier for a user equipment, UE, 14 and the SPI value being unique to an IPsec session associated with the UE 14 (block S110). In some embodiments, the process further includes receiving the indication of the SPI value from one of the first network node 18*a* and the second network node 18*b* and filtering the observed IP traffic based at least in part on the received indication of the SPI value. In some embodiments, the process further includes receiving a security action associated with the SPI value; identifying IPsec traffic associated with a user equipment, UE, 14 based at least in part on the indication of the SPI value; and filtering the identified IPsec traffic associated with the UE 14 according to the received security action. In some embodiments, the security action includes at least one of rate-limiting IPsec traffic associated with UE 14, accepting IPsec traffic associated with the UE 14, and rejecting IPsec traffic associated with the UE 14. In some embodiments, the filtering the observed IPsec traffic based at least in part on the indication of the SPI value comprises matching SPI fields of the observed IPsec packets to the SPI value; and filtering at least one IPsec packet based on whether an SPI field of the IPsec packet matches the SPI value. In some embodiments, the security node is a Layer 3 firewall between the first network node 18*a* and the second network node 18*b*.

Figure 9:
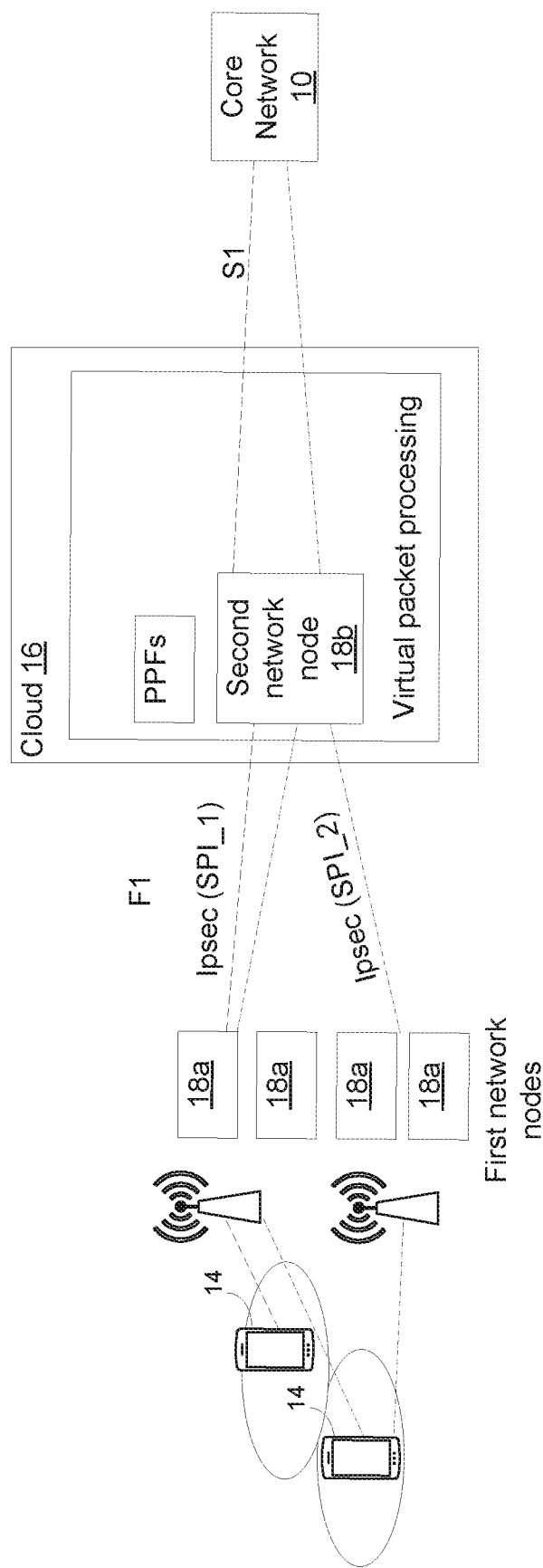
FIG. 9 is a block diagram of exemplary vRAN architecture for signaling storm mitigation according to the principles of the present disclosure.
Figure 10:
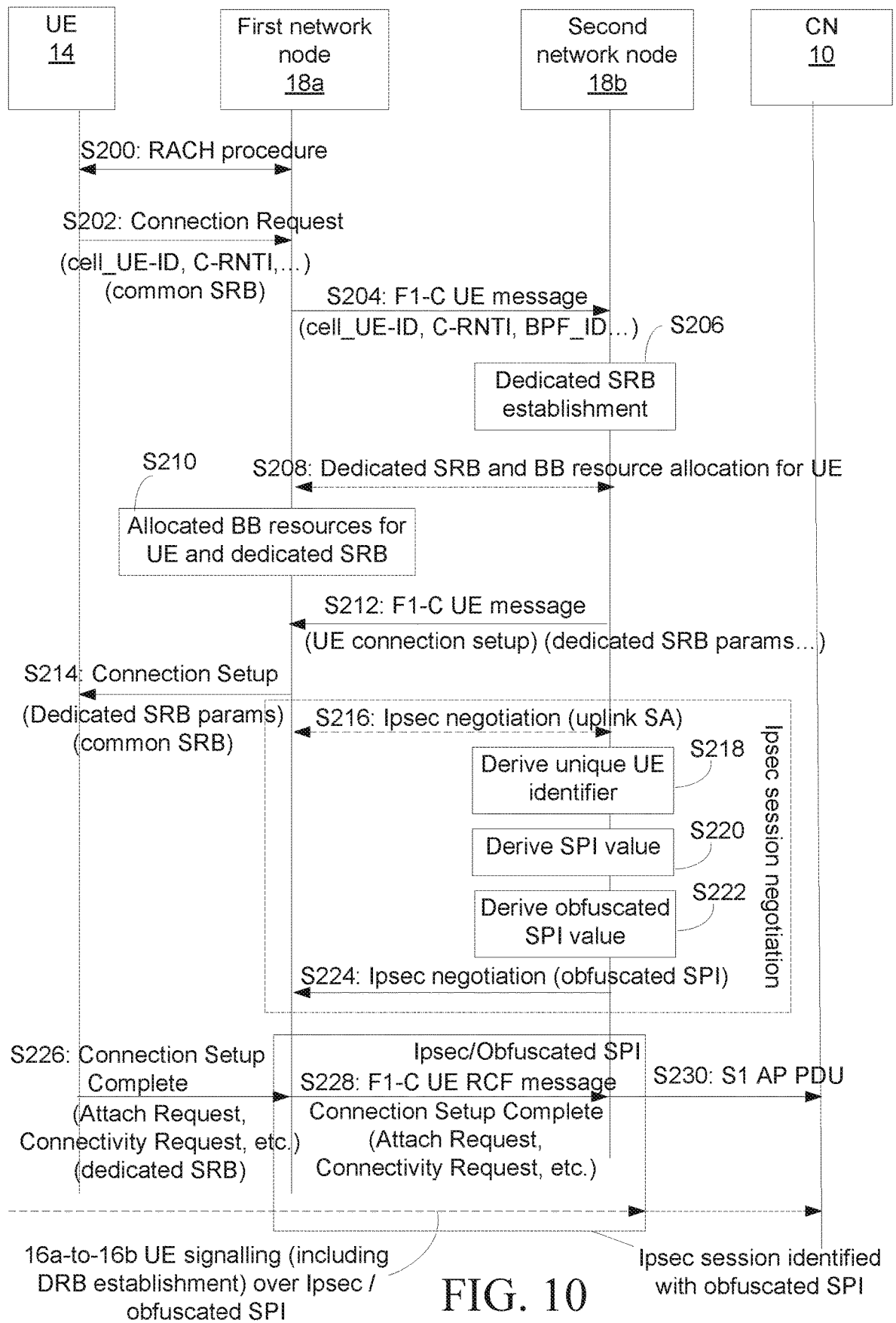
FIG. 10 is a flow diagram illustrating an establishment of an IPsec session protecting UE signaling in vRAN according to the principles of the present disclosure.

Having generally described some embodiments of the present disclosure for facilitating signalling storm mitigation in IPsec-secured vRAN, a more detailed description of some of the embodiments are described below, with reference to FIGS. 9 and 10.

Some embodiments of the present disclosure provide for signalling storm mitigation through UE signalling control at the IP level in IPsec-secured vRAN deployments. FIG. 9 illustrates an example case where signalling data transmission is mobile originated (MO), i.e., UL data transfer. FIG. 9 shows a unique IPsec SPI value associated with signalling data for each UE 14, between the first network node 18*a* (e.g., BPF, gNB-DU, etc.) and the second network node 18*b* (e.g., vRAN RCF, gNB-CU-CP, etc.) to which the respective UE 14 is attached. Thus, the present disclosure provides a method in which information, such as pre-defined information from the UE 14 signalling data (packet) may be reflected in or represented by a unique IPsec SPI value. This may be useful for increasing entropy for the SPI value. Bytes non-associated with the UE information may be random in some embodiments. The following description provides details of what may be performed in an example, with the output being an SPI value, based at least in part on a unique UE identifier (ID).

In some embodiments, the present disclosure provides a method to obfuscate the "packet information" in to an SPI-hash (e.g., secret key+clear text SPI). When no information is required, the method may output a random SPI. A method to filter the packet given the SPI value is also described. In some embodiments, security policies may be provided that allow a filtering node or security node 20 to process IPsec packets based on SPI values.

In some embodiments of the present disclosure, advantageously, changes to the current IPsec stack are not required. A potential issue with such implementation is that it can lead to the first network node 18*a* (e.g., BPF, gNB-DU, etc.) and the second network node 18*b* (e.g., RCF, gNB-CU-CP, etc.) managing multiple, different Security Associations (SAs).

Some embodiments of the present disclosure may provide for the first network node 18*a* (e.g., BPF, gNB-DU, etc.) and the second network node 18*b* (e.g., RCF, gNB-CU-CP, etc.) to not require a clear separation between the IPsec sessions and the cryptographic material may be shared between the Security Associations (SAs), while the SPI value should remain distinct to distinguish the different UEs 14 from one another. An example implementation of the principles of the present disclosure is explained below with reference primarily to the flow diagram of FIG. 10, which illustrates an example of a UE 14 initial access procedure according to at least some of the principles of the present invention.

Unique Clear Text SPI Derivation

At UE 14 connection and attach, at least a dedicated signalling radio bearer (SRB) and default data radio bearer (DRB) are established for the UE 14 between the UE 14 and the second network node 18*b* (e.g., RCF, gNB-CU-CP, etc.) and a packet processing function (PPF), respectively. An IPsec session in uplink may be setup between the first network node 18*a* (e.g., BPF, gNB-DU, etc.) and the second network node 18*b* (e.g., RCF, gNB-CU-CP, etc.) to secure signalling of the UE 14. It should be noted that separate IPsec sessions per various signalling bearers of a particular UE 14 are also contemplated in some embodiments. FIG. 10 depicts a high-level overview of a sequence flow for the establishment of the uplink IPsec session between the first network node 18*a* (e.g., BPF, gNB-DU, etc.) and the second network node 18*b* (e.g., RCF, gNB-CU-CP, etc.) at UE 14 connection and attach according to the principles of the present disclosure.

In step S200, a Random Access Channel (RACH) procedure may be performed by the UE 14 towards the first network node 18*a* (e.g., gNB-DU, BPF). In step S202, the UE 14 may send a connection request message to the first network node 18*a* (e.g., gNB-DU, BPF). The connection request message may be an RRC connection request message and may include a cell UE ID for the UE 14, a C-RNTI, and/or other UE information. In step S204, responsive to the connection request message from step S202, the first network node 18*a* may send a message to the second network node 18*b* over, for example, an F1-C interface. In some embodiments, the message may be a UE connection establishment request message, which may include the cell UE ID, C-RNI, BPF ID, and other UE information. In some embodiments, the message may be an F1 Application Protocol (AP) initial UL RRC message transfer message that includes the RRC connection request message and, if the UE 14 is admitted, corresponding lower layer configuration information for the UE 14. In some embodiments, reception of the connection request message by the second network node 18*b* may be a trigger indicating an establishment of an IPsec session with the second network node 18*b*, for the UE 14. Such trigger may result in the second network node 18*b* generating a globally unique ID for the UE 14 according to the principles in the present disclosure. There may also be other triggers.

In step S206, in response to the UE connection establishment request message from step S204, the second network node 18*b* may perform dedicated SRB establishment. In step S208, dedicated SRB and baseband (BB) resource allocation may be performed for the UE 14. In step S210, the first network node 18*a* may allocate BB resources and dedicated SRB for the UE 14. In step S212, the second network node 18*b* may send a message, e.g., over the F1-C interface, to the first network node 18*a* to indicate the UE 14 connection setup. In some embodiments, the message may be an F1 AP DL RRC message transfer message. In some embodiments, the second network node 18*b* may allocate a gNB-CU UE F1 AP ID for the UE 14 and may generate an RRC connection setup message towards the UE 14. The RRC connection setup message may be encapsulated in the F1 AP DL RRC message transfer message. It should be noted that the initial UE 14 signalling messages on the F1-C interface (e.g., connection request and setup messages from steps 204 and 212), which may be prior to establishment of the dedicated signalling bearer (SRB), may be exchanged on a separate IP session between the first and second network nodes 18*a* and 18*b*.

In step S214, the first network node 18*a* communicates a connection setup message to the UE 14, which may include the dedicated SRB parameters for the UE 14. In some embodiments, the connection setup message in step S214 may be an RRC connection setup message. In step S216, there may be an IPsec negotiation for an SA between the first network node 18*a* and the second network node 18*b*. The IPsec SA negotiation may be considered a part of establishing the IPsec session.

In this example described with reference to FIG. 10, it is the second network node 18*b* (e.g., RCF, gNB-CU-CP, etc.) at the vRAN site that computes and/or generates the unique identifier for the UE 14 in step S218. The unique identifier may be considered a globally unique UE ID that is based at least in part on UE data in the connection request message in e.g., step S204. In one embodiment, a globally unique UE ID is derived for the UE 14 in a cell (in step S218) by concatenating at least some of the information (e.g., UE cell ID, BPF ID, cell ID, etc.) in the message from e.g., step S204 or 202 as follows:

globally_unique_UE_ID=cell_UE_ID|BPF_ID    [|cell_ID], where "|" is the concatenation operator. The different values for concatenation can be extracted from the initial connection request message from the UE 14. For example, BPF_ID may be a value identifying the baseband function. If the first network node 18*a* (e.g., BPF, gNB-DU, etc.) serves several cells with the same cell_UE_ID potentially reused by several UEs 14 in the different cells, there may be an optional parameter ("[ ]") for the second network node 18*b* (e.g., RCF, gNB-CU-CP, etc.) site to rely upon, such as a cell_ID in order to ensure that the unique UE ID that is generated is unique to the IPsec session. In other embodiments, the globally unique UE ID may be derived/generated/encoded by combining UE data according to other techniques and operators.

In some embodiments, the cell_UE_ID may include the Channel Radio Network Temporary Identifier (C-RNTI10) and/or a temporary mobile subscriber identity (TMSI) type of identifier, etc. Also, if a unique identifier for the UE 14 similar to, for example, eNB UE S1AP ID in LTE (Technical Specification 36.401) becomes available at the second network node 18*b* (e.g., RCF, gNB-CU-CP, etc.) before the establishment of the IPsec session, the second network node 18*b* (e.g., RCF, gNB-CU-CP, etc.) may use such unique identifier in addition to (or instead of another UE identifier) to generate the globally unique UE ID. This is because all packets on S1AP may be identified with such unique identifier and can be expected to help in mapping the IPsec packets to S1AP packets. In other embodiments, there may be other UE data used to derive the globally unique UE ID.

In step S220, based on this globally unique UE ID, a specific SPI value for the UE 14 (e.g., Clear_text_SPIUE) may be computed and/or derived during e.g., the IPsec session negotiation between the second network node 18*b* (e.g., RCF, gNB-CU-CP, etc.) and the first network node 18*a*

(e.g., BPF, gNB-DU, etc.). In some embodiments, this IPsec session can secure all the subsequent dedicated signalling radio bearer for the UE 14. The information encoded in one SPI value (e.g., Clear_text_SPIUE) can allow the network to uniquely map the derived SPI value to one active UE 14 in a particular cell, connected to the first network node 18*a* (e.g., BPF, gNB-DU, etc.). Furthermore, the IPsec SPI size is generally 32 bits; thus, the globally unique UE ID may be transformed through, for example, an invertible function such as: Clear_text_SPIUE=func(globally_unique_UE_ID), where func( ) is a function returning a 32 bit size value, with the property that:

globally_unique_UE_ID=func-1 (Clear_text_SPIUE).
For example, func( ) may apply selection of a predetermined number of bits, such as, the first 20 bits (e.g., if the unique UE ID is a C-RNTI that is 20 bits) concatenated with the last 12 bits in the globally unique UE ID, which may include at least part of the BPF_ID and/or cell_ID, for example. Thus, a network node 18 could obtain (e.g., via func-1( )) the globally_unique_UE_ID by observing, for example, the clear text SPI value and the source of the message (e.g., BPF_ID) carrying the clear text SPI value.

Obfuscation of the Clear Text SPI Value

In step S222, the SPI value may optionally be transformed for obfuscation by the IPsec end point (in this example, the second network node 18*b*) into an obfuscated SPI value (e.g., Obfuscated_SPIUE). In step S224, the second network node 18*b* sends the obfuscated SPI value to the other IPsec end point, in this example the first network node 18*a* (e.g., BPF, gNB-DU, etc.). In some embodiments, the second network node 18*b* sends the obfuscated SPI value without any other indication, during the IPsec negotiation. In other embodiments, where step S222 of obfuscating the SPI value is not performed, the second network node 18*b* may send the clear text SPI value instead of the obfuscated SPI value. In some embodiments, the SPI obfuscation may be deactivated for those UEs 14 that are under Lawful Intercept.

Like the clear text SPI value, the obfuscated SPI value (e.g., Obfuscated_SPIUE) may also be uniquely mapped to one active UE 14 connected to one cell. Thus, control on the signalling (and/or data) between IPsec endpoints (e.g., first network node 18*a* and second network node 18*b*) may be enforced by a security node 20, such as an L3 firewall, directly on the IPsec session, anywhere between the first network node 18*a* (e.g., BPF, gNB-DU, etc.) and the site corresponding to the second network node 18*b* (e.g., RCF, gNB-CU-CP, etc.), based on the obfuscated SPI value present in the IPsec header. In some embodiments, the security node 20 may be under the same administration domain with the vRAN entities, or may be managed by another party. It should be noted that, in this example, from the first network node 18*a* (e.g., BPF, gNB-DU, etc.) perspective, the IPsec session establishment may be a legacy one since it is the second network node 18*b* in this example that derives the unique UE ID and generates the SPI value based on the unique UE ID.

In one embodiment, the obfuscation may be performed by an irreversible transformation, such as a hash( ) function that may be applied on the clear text SPI value to obtain the obfuscated SPI (32 bit) value. The objective of obfuscation of the SPI value is generally to conceal any of the meaningful information in the SPI field of the IPsec packets header. Thus, the uplink signalling traffic from the UE 14 can be sent by the first network node 18*a* (e.g., BPF, gNB-DU, etc.) over this IPsec session between the first network node 18*a* (e.g., BPF, gNB-DU, etc.) and the second network node 18*b* (e.g., RCF, gNB-CU-CP, etc.) sites, using the obfuscated SPI value in the IPsec header, as shown, for example, in steps S226 and S228. In step S226, the UE 14 sends the connection setup complete message to the first network node 18*a*. In step S228, the first network node 18*a* sends a message to the second network node 18*b* on e.g., the F1-C interface, in the IPsec tunnel with the obfuscated SPI value in the corresponding IPsec header. In one embodiment, the message includes the connection setup complete message from the UE 14. In one embodiment, the first network node 18*a* encapsulates the message in an F1 AP UL RRC message transfer message and sends the encapsulated message to the second network node 18*b*. In step S230, the second network node 18*b* may send a message to another node or vRAN entity (e.g., PPF, gNB-CU-UP). The message may be a S1 AP PDU.

In one embodiment, the obfuscated SPI value may be derived from the clear text SPI value as follows: Obfuscated_SPIUE=hash_func(Key, Clear_text_SPIUE), where Key is a secret value stored at the second network node 18*b* (e.g., RCF, gNB-CU-CP, etc.) site. When an IPsec packet is received in UL by the second network node 18*b* (e.g., RCF, gNB-CU-CP, etc.) IPsec endpoint (for example, as in step S228), the obfuscated SPI value identifies the Security Association (SA) cryptographic material. In one embodiment, the operations may proceed as follow at second network node 18*b* (e.g., RCF, gNB-CU-CP, etc.) (ingress).

The IPsec Security Association (SA) is identified by the obfuscated SPI value in the IPsec header. The original clear data (e.g., a PDCP PDU) is obtained by decrypting the IPsec packet such as the IPsec packet received in step S228. If the second network node 18*b* receives an invalid (unknown) obfuscated SPI value, there are legacy IPsec procedures that may be used to notify the other IPsec endpoint (e.g., the first network node 18*a*). If the payload does not correspond to the traffic selector (TS), the packet may be dropped; otherwise the globally unique UE ID and the clear text SPI value may be locally computed for the decapsulated payload as described above, based on the various identifiers (IDs) and information found in the decapsulated payload. Next, using the Key secret value, if hash_func(Key, locally_computed_Clear_text_SPIUE) equals Obfuscated_SPIUE, then accept the original decrypted PDU; otherwise, drop the packet. In some embodiments, a similar scheme can be performed that takes the SRBs and DRBs identifiers (IDs) into account in addition to the various IDs used to compute the globally unique UE ID and the clear text SPI value for the UE 14. Advantageously, using SRB and/or DRB IDs can allow the network to enforce a finer control in case of signalling storms and thus distinguish between the various types of signals originating from the UE 14. It should be noted that if the UE 14 operates with dual connectivity, establishing 2 SRBs (e.g., one SRB from a master baseband processing function and one SRB with a secondary baseband processing function), the principles of the disclosure can still be applied by having the IDs discussed above duplicated (e.g., the UE 14 would have 2 different cell IDs).

Filtering Based on IPsec SPI

In some embodiments, filtering (e.g., L3 filtering) of IPsec traffic may be performed by e.g., security node 20 based on an obfuscated IPsec SPI value. In IPsec protected vRAN, at least some of the principles of the present disclosure enable implementation of signalling storm mitigation by enforcing security policies with IP (L3) firewalling directly on the IPsec traffic by simply matching the SPI field of the IPsec packets in the observed first network node 18*a*—second network node 18*b* traffic. Accordingly, each IPsec packet between the first network node 18*a* (e.g., BPFs, gNB-DUs, etc.) and the second network node 18*b* (e.g., RCF, gNB-CU-CP, etc.) can be linked to signalling messages associated with a particular unique UE ID through an IPsec SPI value in the IPsec header. Therefore, filtering rules (e.g., L3 FW filtering rules) that include security policies to mitigate a signalling storm may follow a simple if condition decision template such as, for example, IPsec_hdr.SPI condition [RCF_SPI_value] sec_action, where:

IPsec_hdr.SPI represents the SPI field of the observed IPsec packet headers on the first network node 18*a* (e.g., BPF, gNB-DU, etc.)—second network node 18*b* (e.g., RCF, gNB-CU-CP, etc.) traffic;

condition may be either "if equal" or "if different;"

RCF_SPI_value may represent an IPsec SPI value that is received by the security node 20 from the second network node 18*b* (e.g., RCF, gNB-CU-CP, etc.) site; and sec_action may represent a security action to be performed on the IPsec traffic, which may be e.g., "rate-limit", "accept", "reject", etc., i.e., any classic firewall action.

Regarding the information to be stored on the security node 20 as part of a mitigation policy, such as the SPI value(s) (e.g., RCF_SPI_value(s)), when the security node 20 is not part of the same vRAN administration domain (e.g., the L3 FW is managed by a third party), the SPI value should be an obfuscated SPI value that has no meaningful information outside of the second network node 18*b* (e.g., RCF, gNB-CU-CP, etc.) context. These SPI values may be received by the security node 20 from the second network node 18*b* (e.g., RCF, gNB-CU-CP, etc.) site, together with the mitigation policy/security action (e.g., sec_actions).

On the other hand, if the security node 20 is part of the same vRAN administration domain, then the SPI value can be either an obfuscated SPI value, or a clear text SPI value. For the latter case, the Key used to compute the obfuscated SPI value may be communicated to the security node 20, in addition to the hash( ) function and the clear text SPI values that are subject to be mitigated. In another embodiment, the Key used to compute the obfuscated SPI value may be communicated to the security node 20, in addition to the hash( ) function and the one or more IDs used to derive the globally unique UE ID, as well as the func( ) used to compute the clear text SPI value. In other words, the security node 20 site could reconstitute the obfuscated SPI value from the Key, the different functions, and the inner packet information.

Even though the descriptions herein may be explained in the context of an Uplink (UL) communication from UE 14 to network node 18, it should be understood that the basic principles disclosed may also be applicable to a Downlink (DL) communication from network node 18 towards the UE 14. Similarly, even though the descriptions herein may be explained in the content of the second network node 18*b* deriving the globally unique UE identifier and the SPI value, it is contemplated that the first network node 18*a* may also be configured to derive the globally unique UE identifier and the SPI value in other contexts.

Any two or more embodiments described in this disclosure may be combined in any way with each other.

Some of the abbreviations that may be used herein are as follows:

| Abbreviation | Explanation |
| --- | --- |
| DL | downlink |
| UL | uplink |
| MO | mobile originating |
| PDU | protocol data unit |
| SRB | signalling radio bearer |
| DRB | data radio bearer |
| DPI | deep packet inspection |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first network node comprising processing circuitry configured to:
receive a trigger to establish an Internet Protocol Security, IPsec, session with a second network node, the IPsec session being associated with a user equipment, UE;
responsive to the trigger to establish the IPsec session associated with the UE, derive a unique identifier for the UE;
generate a Security Parameter Index, SPI, value based at least in part on the unique identifier derived for the UE, the SPI value being unique to the IPsec session;
communicate an indication of the SPI value to the second network node;
receive, from the second network node, an IPsec packet, the IPsec packet including the indication of the SPI value; and
decrypt and authenticate the received IPsec packet using at least the indication of the SPI value by being further configured to:
identify a Security Association, SA, of the IPsec packet via the obfuscated SPI value;
decrypt the IPsec packet according to the identified SA to obtain payload data of the decrypted packet;
determine the unique identifier for the UE and the SPI value from the decrypted payload data;
input a key value and the determined SPI value into a hash function,
determine whether the hash function returns an output value that is equal to the obfuscated SPI value, and
one of communicate the decrypted packet and drop the decrypted packet based at least in part on whether the output value of the hash function is equal to the obfuscated SPI value.

2. The first network node of claim 1, wherein the trigger is one of a request message, a request message from the second network node, a control plane message, an indication of an establishment of a radio session for the UE, and a radio bearer establishment message.

3. The first network node of claim 1, wherein the processing circuitry is further configured to:
receive, from the second network node, an IPsec packet, the IPsec packet associated with the UE and the IPsec packet including the indication of the SPI value;
decrypt and authenticate the received IPsec packet using at least the indication of the SPI value; and
communicate, to a third network node, the decrypted packet.

4. The first network node of claim 1, wherein the SPI value maps to IPsec traffic associated with the UE between the first network node and the second network node.

5. The first network node of claim 1, wherein the processing circuitry is further configured to derive the unique identifier for the UE based at least in part on data associated with the UE and, as a result of the derivation, the generation of the SPI value is based at least in part on the data associated with the UE.

6. The first network node of claim 5, wherein the data used to derive the unique identifier and generate the SPI value uniquely identifies IPsec traffic associated with the UE for IP-level filtering of traffic between the first network node and the second network node.

7. The first network node of claim 5, wherein the data used to derive the unique identifier for the UE and generate the SPI value one of:
includes at least one of a Cell UE Identifier, a Baseband Processing Function, BPF, Identifier, and a Cell Identifier;
includes an identification of a radio bearer, RB, for the UE; and
is signalling data associated with the UE.

8. The first network node of claim 5, wherein the data associated with the UE is data corresponding to one of an Uplink, UL, channel and a Downlink, DL, channel for the UE.

9. The first network node of claim 1, wherein the processing circuitry is further configured to derive the unique identifier for the UE by concatenating the data associated with the UE.

10. The first network node of claim 1, wherein the processing circuitry is further configured to generate the SPI value by inputting the unique identifier into an invertible function that returns a 32-bit value representing the SPI.

11. The first network node of claim 1, wherein the indication of the SPI value is one of a clear text SPI value and an obfuscated SPI value.

12. The first network node of claim 1, wherein the processing circuitry is further configured to obfuscate the SPI value and the communication of the indication of the SPI value is a communication of the obfuscated SPI value to the second network node.

13. The first network node of claim 12, wherein the processing circuitry is configured to obfuscate the SPI value by being further configured to input at least the generated SPI value into a hash function.

14. The first network node of claim 12, wherein the processing circuitry is configured to obfuscate the SPI value by being further configured to input the generated SPI value and a key value into a hash function to generate the obfuscated SPI value.

15. The first network node of claim 1, wherein the processing circuitry is further configured to communicate, to a security node, at least the indication of the SPI value for Internet Protocol, IP, -level filtering of IPsec traffic between the first network node and the second network node.

16. The first network node of claim 15, wherein the processing circuitry is further configured to communicate, to the security node, a security action associated with the SPI value, the security action to be performed by the security node on IPsec traffic between the first network node and the second network node and the SPI value identifying the UE for the performance of the security action.

17. The first network node of claim 16, wherein the security action includes at least one of rate-limiting IPsec traffic associated with UE, accepting IPsec traffic associated with the UE, and rejecting IPsec traffic associated with the UE.

18. A method for a first network node, the method comprising:
  receiving a trigger to establish an Internet Protocol Security, IPsec, session with a second network node, the IPsec session being associated with a user equipment, UE;
  responsive to the trigger to establish the IPsec session associated with the UE, deriving a unique identifier for the UE;
  generating a Security Parameter Index, SPI, value based at least in part on the unique identifier for the UE, the SPI value being unique to the IPsec session; and
  communicating an indication of the SPI value to the second network node receiving, from the second network node, an IPsec packet, the IPsec packet including the indication of the SPI value; and
  decrypting and authenticating the received IPsec packet using at least the indication of the SPI value by:
    identifying a Security Association, SA, of the IPsec packet via the obfuscated SPI value;
    decrypting the IPsec packet according to the identified SA to obtain payload data of the decrypted packet;
    determining the unique identifier for the UE and the SPI value from the decrypted payload data,
    inputting a key value and the determined SPI value into a hash function,
    determining whether the hash function returns an output value that is equal to the obfuscated SPI value; and
    one of communicating the decrypted packet and dropping the decrypted packet based at least in part on whether the output value of the hash function is equal to the obfuscated SPI value.

19. The method of claim 18, wherein the trigger is one of a request message, a request message from the second network node, a control plane message, an indication of an establishment of a radio session for the UE, and a radio bearer establishment message.

20. The method of claim 18, further comprising:
  receiving, from the second network node, an IPsec packet, the IPsec packet associated with the UE and the IPsec packet including the indication of the SPI value;
  decrypting and authenticating the received IPsec packet using at least the indication of the SPI value; and
  communicating, to a third network node, the decrypted packet.

21. The method of claim 18, wherein the SPI value maps to IPsec traffic associated with the UE between the first network node and the second network node.

22. The method of claim 18, wherein deriving the unique identifier further comprises deriving the unique identifier for the UE based at least in part on data associated with the UE and, as a result of the derivation, the generation of the SPI value is based at least in part on the data associated with the UE.

23. The method of claim 22, wherein the data used to derive the unique identifier and generate the SPI value uniquely identifies IPsec traffic associated with the UE for IP-level filtering of traffic between the first network node and the second network node.

24. The method of claim 22, wherein the data used to derive the unique identifier for the UE and generate the SPI value one of:
  includes at least one of a Cell UE Identifier, a Baseband Processing Function, BPF, Identifier, and a Cell Identifier;
  includes an identification of a radio bearer, RB, for the UE; and
  is signalling data associated with the UE.

25. The method of claim 22, wherein the data associated with the UE is data corresponding to one of an Uplink, UL, channel and a Downlink, DL, channel for the UE.

26. The method of claim 18, wherein deriving the unique identifier further comprises deriving the unique identifier for the UE by concatenating the data associated with the UE.

27. The method of claim 18, wherein generating the SPI value further comprises generating the SPI value by inputting the unique identifier into an invertible function that returns a 32-bit value representing the SPI.

28. The method of claim 18, wherein the indication of the SPI value is one of a clear text SPI value and an obfuscated SPI value.

29. The method of claim 18, further comprising obfuscating the SPI value and the communication of the indication of the SPI value comprises a communication of the obfuscated SPI value.

30. The method of claim 29, wherein the obfuscating the SPI value further comprises obfuscating the SPI value by inputting at least the generated SPI value into a hash function.

31. The method of claim 29, wherein the obfuscating the SPI value further comprises obfuscating the SPI value by inputting the generated SPI value and a key value into a hash function to generate the obfuscated SPI value.

32. The method of claim 18, further comprising communicating, to a security node, at least the indication of the SPI value for Internet Protocol, IP, -level filtering of IPsec traffic between the first network node and the second network node.

33. The method of claim 32, further comprising communicating, to the security node, a security action associated with the SPI value, the security action to be performed by the security node on IPsec traffic between the first network node and the second network node and the SPI value identifying the UE for the performance of the security action.

34. The method of claim 33, wherein the security action includes at least one of rate-limiting IPsec traffic associated with UE, accepting IPsec traffic associated with the UE, and rejecting IPsec traffic associated with the UE.

* * * * *